(12) United States Patent
Griggs et al.

(10) Patent No.: US 11,798,032 B1
(45) Date of Patent: *Oct. 24, 2023

(54) DETERMINING IP ADDRESSES THAT ARE ASSOCIATED WITH PHYSICAL LOCATIONS WITH NEW OCCUPANTS AND PROVIDING ADVERTISEMENTS TAILORED TO NEW MOVERS TO ONE OR MORE OF THOSE IP ADDRESSES

(71) Applicant: El Toro.Com, LLC, Louisville, KY (US)

(72) Inventors: Stacy B. Griggs, Shelbyville, KY (US); David T. Stadler, III, Louisville, KY (US); Richard M. Teachout, III, Louisville, KY (US); Benjamin Charles Woolley, Bothell, WA (US)

(73) Assignee: EL TORO.COM, LLC, Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/676,438

(22) Filed: Feb. 21, 2022

Related U.S. Application Data

(63) Continuation of application No. 16/450,228, filed on Jun. 24, 2019, now Pat. No. 11,258,754, which is a (Continued)

(51) Int. Cl.
*G06Q 30/0251* (2023.01)
*G06Q 30/0241* (2023.01)
(Continued)

(52) U.S. Cl.
CPC ..... *G06Q 30/0261* (2013.01); *G06Q 30/0241* (2013.01); *H04L 61/106* (2013.01);
(Continued)

(58) Field of Classification Search
CPC ............ G06Q 30/0261; G06Q 30/0241; H04L 61/5084; H04L 61/106; H04L 61/5007; H04L 2101/668
(Continued)

(56) References Cited

U.S. PATENT DOCUMENTS 5,946,679 A    8/1999  Ahuja et al.
6,625,662 B1   9/2003  Satoh et al.
(Continued)

OTHER PUBLICATIONS

New Movers Database; Experian Marketing Services, Experian Information Solutions, Inc. (2008) 2 pages. Nov. 1, 2008.

*Primary Examiner* — James E Springer
(74) *Attorney, Agent, or Firm* — Gray Ice Higdon

(57) ABSTRACT

Methods related to determining and utilizing one or more attributes to associate with an IP addresses. Attributes are determined based on request data provided with requests from an IP address and one or more available secondary information sources. Attributes may include physical locations and/or category designations for the IP address. One or more attributes may be assigned a likelihood value indicative of likelihood that the attribute is associated with the IP address. Some implementations are directed to utilizing the attributes and likelihood values to identify likely fraudulent information provided with requests. Some implementations are directed to utilizing the attributes and likelihood values to provide advertisements in response to requests from IP addresses.

20 Claims, 12 Drawing Sheets

Related U.S. Application Data continuation of application No. 14/936,930, filed on Nov. 10, 2015, now Pat. No. 10,333,890, which is a continuation-in-part of application No. 14/547,915, filed on Nov. 19, 2014, now Pat. No. 9,515,984.

(60) Provisional application No. 61/906,027, filed on Nov. 19, 2013.

(51) Int. Cl.
  *H04L 61/106* (2022.01)
  *H04L 61/5084* (2022.01)
  *H04L 61/5007* (2022.01)
  *H04L 101/668* (2022.01)
  *H04L 101/69* (2022.01)

(52) U.S. Cl.
  CPC ...... *H04L 61/5084* (2022.05); *H04L 61/5007* (2022.05); *H04L 2101/668* (2022.05); *H04L 2101/69* (2022.05)

(58) Field of Classification Search
  USPC .......................................... 709/245
  See application file for complete search history.

(56) References Cited

U.S. PATENT DOCUMENTS

| | | |
|---|---|---|
| 6,665,297 B1 | 12/2003 | Hariguchi et al. |
| 7,558,687 B1 | 7/2009 | Bode |
| 8,145,754 B2 | 3/2012 | Chamberlain et al. |
| 8,204,965 B2 | 6/2012 | Shkedi |
| 8,346,770 B2 | 1/2013 | Smith et al. |
| 8,386,293 B2 | 2/2013 | Nugent et al. |
| 8,548,910 B1 | 10/2013 | Hamilton et al. |
| 8,676,799 B1 | 3/2014 | Vaver |
| 8,712,805 B1 | 4/2014 | Ferries et al. |
| 9,026,145 B1 | 5/2015 | Duleba et al. |
| 9,177,281 B2 | 11/2015 | Parameswaran et al. |
| 9,277,365 B1 | 3/2016 | Wilden et al. |
| 9,515,984 B1 | 12/2016 | Griggs et al. |
| 9,742,727 B1 | 8/2017 | Griggs et al. |
| 2002/0002590 A1 | 1/2002 | King et al. |
| 2002/0032608 A1 | 3/2002 | Kanter |
| 2002/0059197 A1 | 5/2002 | Hunter et al. |
| 2003/0036949 A1 | 2/2003 | Kaddeche et al. |
| 2003/0079017 A1 | 4/2003 | Agrawal et al. |
| 2003/0135442 A1 | 7/2003 | Kumar et al. |
| 2005/0136886 A1 | 6/2005 | Aarnio et al. |
| 2005/0188221 A1 | 8/2005 | Motsinger et al. |
| 2006/0018325 A1 | 1/2006 | Conrad |
| 2006/0242024 A1 | 10/2006 | Mattingly et al. |
| 2007/0078983 A1 | 4/2007 | Modrall |
| 2008/0062940 A1 | 3/2008 | Othmer et al. |
| 2008/0196098 A1 | 8/2008 | Cottrell et al. |
| 2008/0244046 A1 | 10/2008 | Campbell et al. |
| 2008/0244076 A1 | 10/2008 | Shah et al. |
| 2008/0255944 A1 | 10/2008 | Shah et al. |
| 2008/0270224 A1 | 10/2008 | Portman et al. |
| 2009/0005087 A1 | 1/2009 | Lunati et al. |
| 2009/0012933 A1 | 1/2009 | Verini |
| 2009/0037602 A1 | 2/2009 | Patel et al. |
| 2009/0082919 A1 | 3/2009 | Hershey et al. |
| 2009/0089558 A1 | 4/2009 | Bradford et al. |
| 2009/0147798 A1 | 6/2009 | Del Prado |
| 2009/0216642 A1 | 8/2009 | Ho et al. |
| 2009/0234738 A1 | 9/2009 | Britton et al. |
| 2010/0030691 A1 | 2/2010 | Cannon et al. |
| 2010/0036970 A1 | 2/2010 | Sidi et al. |
| 2010/0220616 A1 | 9/2010 | Glyakov et al. |
| 2011/0035284 A1 | 2/2011 | Moshfeghi |
| 2011/0044226 A1 | 2/2011 | Song et al. |
| 2011/0119133 A1 | 5/2011 | Igelman et al. |
| 2011/0177829 A1 | 7/2011 | Platt et al. |
| 2011/0294464 A1 | 12/2011 | Fiatal |
| 2012/0005017 A1 | 1/2012 | Gupta |
| 2012/0011068 A1 | 1/2012 | Dearing et al. |
| 2012/0029314 A1 | 2/2012 | Paquet et al. |
| 2012/0102169 A1 | 4/2012 | Yu et al. |
| 2012/0174220 A1 | 7/2012 | Rodriguez |
| 2012/0330757 A1 | 12/2012 | Heidenreich et al. |
| 2013/0060633 A1 | 3/2013 | St-Pierre |
| 2013/0138509 A1 | 5/2013 | Ruarte et al. |
| 2013/0148573 A1 | 6/2013 | Boland et al. |
| 2013/0218710 A1 | 8/2013 | Golden et al. |
| 2013/0268375 A1 | 10/2013 | Isbister |
| 2013/0297426 A1 | 11/2013 | Marx et al. |
| 2013/0326554 A1 | 12/2013 | Shkedi |
| 2014/0019561 A1 | 1/2014 | Belity et al. |
| 2014/0032326 A1 | 1/2014 | Li et al. |
| 2014/0037074 A1 | 2/2014 | Bravo et al. |
| 2014/0077964 A1 | 3/2014 | Beligere et al. |
| 2014/0089024 A1 | 3/2014 | Mason et al. |
| 2014/0126419 A1 | 5/2014 | Boland et al. |
| 2014/0156669 A1 | 6/2014 | Bati et al. |
| 2014/0208424 A1 | 7/2014 | Hudack et al. |
| 2014/0222571 A1 | 8/2014 | Chandra et al. |
| 2014/0244329 A1 | 8/2014 | Urban |
| 2014/0244351 A1 | 8/2014 | Symons |
| 2014/0278973 A1 | 9/2014 | Lowe et al. |
| 2014/0280898 A1 | 9/2014 | Voit et al. |
| 2014/0324810 A1 | 10/2014 | Wang et al. |
| 2015/0032551 A1 | 1/2015 | Ekambaram et al. |
| 2015/0106198 A1 | 4/2015 | Miller et al. |
| 2015/0186936 A1 | 7/2015 | Sitarzewski |
| 2015/0244819 A1 | 8/2015 | Duleba et al. |
| 2015/0271132 A1 | 9/2015 | Erb |
| 2015/0381490 A1 | 12/2015 | Perez et al. |
| 2016/0021178 A1 | 1/2016 | Liu et al. |
| 2016/0247175 A1 | 8/2016 | Milton et al. |
| 2016/0344751 A1 | 11/2016 | Leach |
| 2016/0379279 A1 | 12/2016 | Ashery et al. |
| 2017/0178270 A1 | 6/2017 | Gersh et al. |

DETERMINING IP ADDRESSES THAT ARE ASSOCIATED WITH PHYSICAL LOCATIONS WITH NEW OCCUPANTS AND PROVIDING ADVERTISEMENTS TAILORED TO NEW MOVERS TO ONE OR MORE OF THOSE IP ADDRESSES

BACKGROUND

Various providers produce "new movers" lists that include a listing of physical addresses that have new occupants, and optionally additional information related to the physical addresses (e.g., dwelling type (e.g., house, apartment, office), census type, neighborhood information), and/or to the occupants (e.g., estimated household income, age, dwelling type of former dwelling). Various companies use the new movers lists to send snail mail to those physical addresses that is particularly targeted to new movers.

Separately, various techniques are utilized to ascertain additional information regarding a visitor to a webpage so that advertisements may be better tailored to the visitor. Conventional techniques rely on usage of cookies during browsing sessions and/or user provided verification information (e.g., a "single sign-on" system) to ascertain additional information about a user. However, those techniques may suffer from one or more drawbacks. For example, the techniques may not enable accurate determination that a visitor to a webpage is a new mover. Also, for example, some of those techniques are overly invasive and present inherent privacy concerns. Also, some of these techniques are subject to fraud because the users may supply false information that is difficult to independently verify. Moreover, many requests may not be associated with cookies and/or user provided verification information.

SUMMARY

This specification is directed generally to determining one or more attributes to associate with an Internet Protocol (IP) address. In some implementations, the attributes may include a physical address to associate with the IP address. In some implementations, the attributes may additionally and/or alternatively include an indication that the IP address is associated with a physical location with a new occupant. For example, some implementations are directed to a system of one or more computers receiving a new movers listing that includes a plurality of new mover physical locations that have new occupants, and determining, by the system, a group of "new mover" IP addresses that have assigned IP address physical locations that match the new mover locations of the new movers listing and that have at least one additional assigned attribute that satisfies at least one criterion. For example, the at least one additional assigned attribute may include an IP address discovery timestamp (an indicator of when the IP address was discovered in use) and the at least one criterion may be a temporal threshold (e.g., that the discovery timestamp indicates discovery within the last month, within the last week, or within the last 3 days). Also, for example, the at least on additional assigned attribute may additionally and/or alternatively include a residential likelihood that the IP address is associated with a residential location and the at least one criterion may be a likelihood threshold. In some implementations, the system may further select an advertisement tailored to new movers in response to receiving an IP request activity from an IP address of the group of new mover IP addresses, and transmit, in response to the IP request activity, the advertisement for electronically providing to the IP address.

In some implementations, the attributes to associate with the IP address may additionally and/or alternatively include one or more categories to associate with the IP address, such as categories indicative of the IP address being residential, commercial, a hotspot, etc. In some implementations, the attributes may additionally and/or alternatively include one or more fraud scores that provide an indication of likelihood that requests originating from the IP address include fraudulent information. In various implementations, one or more of the attributes may be determined based on request data that is associated with one or more web-based requests from the IP address and/or based on secondary available information that is optionally identifiable independent of the one or more requests from the IP address. The determined attributes for an IP address may be utilized for various purposes such as determining likelihood that requests emanating from the IP address include fraudulent information, determining whether an advertisement should be served responsive to a future request emanating from the IP address, and/or determining which of multiple available advertisements should be served responsive to a future request emanating from the IP address.

As described above, some implementations generally relate to determining a physical address for an IP address, such as a physical address that identifies one or more of a street address, a city, a state, a ZIP code, a census block, and/or a neighborhood. In some of those implementations, physical addresses may be determined for IP addresses based on internet traffic originating from one or more requests associated with the IP addresses, such as webpage requests, advertisement demand-side platform (DSP) requests, and/or other web-based requests. Request data associated with each of those requests may be provided and may include identifying information about the user and/or computing device that originated the respective request. In some implementations, a physical address may be determined for an IP address based on such request data and optionally based on data from one or more available secondary sources. For example, in some implementations a physical address included in the request data may only be determined to be the physical address for the IP address when the physical address corresponds to data from one or more secondary sources, such as data that indicates a geographic area known to be associated with the IP address and/or trace route information associated with the IP address. Also, for example, in some implementations request data associated with an IP address may include a username, last name, and/or other identifying information and may be compared to a listing of information for multiple users, such as a census listing, customer listing, or other listing of individuals and addresses to determine a physical address to associate with an IP address. In some implementations, where multiple requests are associated with an IP address, characteristics of those multiple requests may be compared to one another (and/or secondary data) to determine if it is appropriate to determine and assign a physical address for that IP address. For example, determining whether it is appropriate to determine and assign a physical address for an IP address may be based on computing device type(s) associated with the multiple requests, temporal characteristics associated with the requests (time of requests, duration of requests, etc.), connection speeds associated with the requests, webpages associated with the requests, and/or account information associated with the requests.

As also described above, some implementations generally relate to determining one or more categories that are associated with an IP address, such as categories indicative of the IP address being residential, commercial, a hotspot, etc. In some of those implementations, a likelihood value may be determined that the IP address is associated with each of one or more of the categories. For example, in some implementations a likelihood value indicative of an IP address being residential and/or commercial may be determined based on request data associated with one or more requests originating from the IP address, times and/or duration of the requests, and/or other characteristics of the requests.

As also described above, some implementations generally relate to determining one or more fraud scores for an IP address that provide an indication of likelihood that requests originating from the IP address are fraudulent. In some of those implementations, the fraud score for an IP address may be based at least in part on a quantity of advertisement selections associated with the IP address (e.g., a strict quantity per day or other time period and/or a click through rate). In some of those implementations, the fraud score for an IP address may additionally or alternatively be based at least in part on a quantity of credit card charge-backs and/or other indications of fraud that are determined to be associated with the IP address based on secondary data. In some implementations, a fraud score for a particular request from an IP address may additionally or alternatively be determined based at least in part on comparison of data associated with that particular request to a physical address and/or category (and optionally a likelihood that the IP address meets the criteria for that category) associated with that IP address. For example, an IP address' request that includes credit card information may be identified as likely fraudulent if a ZIP code associated with the credit card information does not match one or more physical location ZIP codes associated with that IP address.

In some implementations, the physical location and/or fraud score for an IP address may be determined based at least in part on secondary information that includes a mapping of one or more masked address to an indication of the physical location. For example, a physical location for an IP address may be identified based on request data, and the veracity of one or more aspects of the physical location may be determined based on the mapping one or more masked IP address to the indication of the physical location. For instance, the indication of the physical location may include a mean or median ZIP code mapped to a masked address, and one or more statistical distributions of ZIP codes around the mean or median ZIP code. The ZIP code for the physical location identified in the request data is accurate may be determined by applying the statistical distribution associated with the masked address and determining a confidence level for the physical location. Some implementations of the disclosure are directed generally to generating a mapping of one or more masked IP addresses to one or more indications of physical locations.

In some implementations, a method of determining IP addresses that are associated with physical locations with new occupants is provided that includes: identifying, by a system of one or more computers, a plurality of new mover listing physical locations from a new movers listing that identifies the new mover listing physical locations as having new occupants; and accessing, by the system, at least one electronic database that includes IP addresses each assigned to a corresponding IP address physical location. The electronic database further includes, for each of a plurality of the IP addresses, at least one corresponding additional attribute that is assigned to the IP address. The method further includes: determining, by the system, a group of the IP addresses of the electronic database that are associated with physical locations with new occupants, the determining comprising selecting a set of the IP addresses for inclusion in the group based on determining that the corresponding IP address physical locations assigned to the IP addresses of the set each match a corresponding one of the new mover listing physical locations and based on determining that the corresponding additional attributes that are assigned to the IP addresses of the set satisfy at least one criterion. The method further includes: receiving, by the system, an IP request activity from a given IP address of the group of IP addresses subsequent to determining the group of the IP addresses; selecting, by the system and based on determining the given IP address belongs to the group of the IP addresses, an advertisement tailored to new movers; and transmitting, by the system and in response to the IP request activity, the advertisement for electronically providing to the given IP address.

This method and other implementations of technology disclosed herein may each optionally include one or more of the following features.

In some implementations, the corresponding additional attributes that are assigned to the IP addresses of the set include IP address discovery timestamps and the at least one criterion is a temporal threshold. Each of the IP address discovery timestamps provides a temporal indicator of when a corresponding IP address of the set was discovered in use.

In some implementations, the corresponding additional attributes that are assigned to the IP addresses of the set include residential likelihoods. Each of the residential likelihoods indicates a likelihood that a corresponding IP address of the set is associated with a residential location. In some of those implementations, the method further includes determining, by the system, a residential likelihood of the residential likelihoods for an IP address of the IP addresses based on a plurality of requests originating from the IP address. For example, determining the residential likelihood based on the plurality of requests originating from the IP address may comprise determining the residential likelihood based on a quantity of the requests from the IP address and/or times associated with the requests from the IP address.

In some implementations, the corresponding additional attributes that are assigned to the IP addresses of the set include connection speed indications that each indicates a corresponding connection speed of a corresponding IP address of the set. In some of those implementations the at least one criterion includes that the connection speed is less than a threshold connection speed.

In some implementations, the method further includes: verifying, by the system, that the advertisement electronically provided to the given IP address is selected via user interface input at a computing device associated with the given IP address; and based on the verifying, selecting the corresponding IP address physical location for targeting with non-electronic communications.

In some implementations, the corresponding IP address physical location assigned to the given IP address identifies an area that encompasses a plurality of particular residential addresses. In some of those implementations, selecting the given IP address for inclusion in the group comprises: determining that the corresponding IP address physical location assigned to the given IP address matches a given mover listing physical location of the mover listing physical locations based on the given mover listing physical location being one of the particular residential addresses encompassed by the corresponding IP address physical location assigned to the given IP address. The area identified by the corresponding IP address physical location assigned to the given IP address may be a numerical identifier, such as a zip code or a census block.

In some implementations, the method further includes: identifying an IP address associated with one or more electronic requests; receiving request data for the IP address, the request data provided in combination with the one or more electronic requests and comprising one or more of: one or more user web names, one or more user actual names, one or more user street addresses, one or more cities, and one or more ZIP codes; identifying, from an electronic mapping of available secondary information, particular additional information that is associated with at least one of the IP address and the request data, the particular additional information part of the secondary available information and including information that is in addition to the request data; determining an IP address physical location for the IP address based on the request data and the particular additional information; and assigning, in the one or more databases, the IP address physical location to the IP address as one of the IP addresses each assigned to a corresponding IP address physical location. In some of those implementations, the secondary information includes a mapping of one or more masked addresses of the IP address to an indication of the physical location, and determining the physical location based on the request data and the particular additional information includes: identifying the physical location based on the request data; and verifying one or more aspects of the physical location are mapped to the IP address in the secondary information.

In some implementations, a method is provided and includes the steps of: identifying an IP address associated with one or more electronic requests; receiving request data for the IP address, the request data provided in combination with the one or more electronic requests and including one or more of: one or more user web names, one or more user actual names, one or more user street addresses, one or more cities, and one or more ZIP codes; identifying, from an electronic mapping of available secondary information, particular additional information that is associated with at least one of the IP address and the request data, the particular additional information part of the secondary available information and including information that is in addition to the request data; determining a physical location for the IP address based on the request data and the particular additional information; and assigning the physical location to the IP address in one or more databases.

This method and other implementations of technology disclosed herein may each optionally include one or more of the following features.

In some implementations, the secondary information may include a mapping of one or more masked addresses of the IP address to an indication of the physical location, and determining the physical location based on the request data and the particular additional information may include: identifying the physical location based on the request data; and verifying one or more aspects of the physical location are mapped to the IP address in the secondary information. The indication of the physical location in the secondary information may include a numerical indication of the physical location for a masked address of the one or more masked addresses for the IP address and may include a statistical distribution of values. Verifying the one or more aspects of the physical location are mapped to the IP address in the secondary information may include verifying a numerical aspect of the one or more aspects of the physical location is the numerical indication or within an acceptable range based on the statistical distribution of values. The numerical indication may be an ordinal of a geographic ordering system. The method may further include generating the numerical indication of the physical location for the masked address, the generating the numerical indication including the steps of: selecting a set of IP addresses that each have the masked address; identifying a plurality of ordinals of the geographic ordering system, each of the ordinals being associated with one of the IP addresses of the set; calculating an expected value based on the plurality of ordinals; assigning the expected value as the numerical indication; calculating a probability distribution based on the plurality of ordinals and the expected value; and assigning the probability distribution as the statistical distribution of values. The expected value may be one of a mean and a median value, and wherein the probability distribution may indicate one or more deviation probabilities.

In some implementations, the method may further include: assigning the IP address to an electronic advertisement campaign based on the assigned physical address being a target of the electronic advertisement campaign; and serving an electronic advertisement of the electronic advertisement campaign responsive to receiving an electronic advertisement request associated with the IP address.

In some implementations, the particular additional information may include a regional location of the IP address, and the request data may define the physical location at a level of granularity that is more particular than the regional location of the IP address. Determining the physical location for the IP address may be based on the request data and the particular additional information may include verifying the physical location is a subset of the regional location.

In some implementations the particular additional information may include an internet service provider associated with the IP address and one or more geographic locations associated with the internet service provider. Determining the physical location for the IP address based on the request data and the particular additional information includes verifying the physical location is based on at least one of the geographic locations.

In some implementations, determining the physical location for the IP address based on the request information and the particular additional information may include: comparing the request data to the particular additional information; determining at least a threshold level of the request data corresponds spatially with the particular additional information; and based on determining the threshold level of the request data corresponds spatially with the particular additional information, using as the physical location one of each of one or more of: the one or more user street addresses, the one or more cities, and the one or more ZIP codes. The particular additional information may include traceroute data mapped to the physical location and determining at least a threshold level of the request data corresponds spatially with the particular additional information may include identifying one or more traceroutes of the IP address and determining whether the one or more traceroutes correspond spatially with the traceroute data.

In some implementations, the method may further include receiving fraud data associated with each of one or more of the electronic requests; determining a fraud value for the IP address based on the fraud data; and assigning the fraud value to the IP address in the one or more databases. The fraud data may include indications of whether a credit card charge-back occurred as a result of each of one or more transactions associated with the IP address; and determining the fraud value for the IP address based on the fraud data may include determining the fraud value based on a quantity of the indications. Determining the fraud value may include calculating a ratio of fraudulent to non-fraudulent requests of the electronic requests; and determining the fraud value may include determining whether the ratio exceeds a threshold ratio. Determining the fraud value may include determining a number of fraudulent requests; and determining the fraud value may include determining whether the number of fraudulent requests satisfies a threshold.

In some implementations, a method is provided and includes the steps of: identifying a corpus of IP addresses and associated numerical identifiers, each of the numerical identifiers identifying a physical location associated with a respective of the IP addresses; selecting a set of IP addresses that each have a first masked address; identifying the numerical identifiers that are associated with the IP addresses of the set; calculating one of a mean and a median value based on the identified numerical identifiers; calculating a statistical distribution of values based on the identified numerical identifiers; assigning the statistical distribution of values and the one of the mean and the median value to the masked address; receiving an IP address; determining the IP address has the masked address; identifying the statistical distribution of values and the one of the mean and the median value based on determining the IP address has the masked address; determining a likelihood the IP address is associated with an IP address physical location based at least in part on the statistical distribution of values and the one of the mean and the median value; determining the likelihood satisfies a threshold value; and assigning the physical location to the IP address based on the likelihood satisfying the threshold value.

In some implementations, a method is provided and includes the steps of: identifying an IP address associated with one or more electronic requests; receiving request data for the IP address, the request data provided in combination with the one or more electronic requests and including one or more of: one or more user web names, one or more user actual names, one or more user street addresses, one or more cities, and one or more ZIP codes; determining a likelihood value that the IP address is has a categorical attribute based on the request data; and assigning the likelihood value to the IP address in one or more databases.

This method and other implementations of technology disclosed herein may each optionally include one or more of the following features.

In some implementations, the method may further include identifying, from an electronic mapping of available secondary information, particular additional information that is associated with at least one of the IP address and the request data, the particular additional information part of the secondary available information and including information that is in addition to the request data; and wherein determining the categorical attribute of the IP address may be further based on the particular additional information.

In some implementations, the request data may further include at least one of a starting time, an ending time, a message size, and a duration of each of one or more of the requests. Determining the likelihood value that the IP address has the categorical attribute may be based on one or more of the starting time, the ending time, the message size, and the duration of one or more of the requests.

In some implementations, a method is provided and includes: identifying a request originating from an IP address of a user, the request including a physical location; identifying, from one or more databases, an expected physical location associated with the IP address, the expected physical location associated with the IP address in the one or more databases based on request data of one or more previous identifications of requests associated with the IP address; and calculating a likelihood that the request is fraudulent based on comparing the physical location to the expected physical location.

This method and other implementations of technology disclosed herein may each optionally include one or more of the following features.

In some implementations, the one or more databases may include a mapping of a masked address to the expected physical location, and identifying the expected physical location associated with the IP address may include: determining the IP address matches the masked address, and identifying the expected physical location based on the mapping of the expected physical location to the masked address. The expected physical location may include a numerical indication and statistical distribution of values for the numerical indication, and calculating the likelihood that the request is fraudulent based on comparing the physical location to the expected physical location may include calculating the likelihood based on the physical location, the numerical indication, and the statistical distribution of values. The numerical indication may be an ordinal of a geographic ordering system.

In some implementations, the one or more databases may include mappings of a first masked address to the expected physical location and a second masked address to a second expected physical location. Identifying the expected physical location associated with the IP address may include: determining the IP address has the masked address and identifying the expected physical location based on the mapping of the expected physical location to the masked address. The method may further include: determining the IP address has the second masked address; identifying the second expected physical location is consistent with the IP address based on the mapping of the second expected physical location to the second masked address; and calculating the likelihood that the request is fraudulent may be further based on comparing the physical location to the second expected physical location.

In some implementations, a method is provided and includes: identifying a corpus of IP addresses and associated numerical identifiers, each of the numerical identifiers identifying a physical location associated with a respective of the IP addresses; selecting a set of IP addresses that each have a first masked address; identifying the numerical identifiers that are associated with the IP addresses of the set; calculating an expected value based on the identified numerical identifiers; calculating a statistical distribution of values based on the identified numerical identifiers; assigning the statistical distribution of values and the expected value to the masked address; receiving an IP address; determining the IP address has the masked address; identifying the statistical distribution of vales and the expected value based on determining the IP address has the masked address; and determining a likelihood the IP address is associated with an IP address physical location based at least in part on the statistical distribution of values and the expected value.

This method and other implementations of technology disclosed herein may each optionally include one or more of the following features.

In some implementations, the method may further include: determining the likelihood satisfies a threshold value; and assigning the physical location to the IP address based on the likelihood satisfying the threshold value. Receiving the IP address may include receiving the IP address and the physical location responsive to an electronic transaction submission from the IP address and the method may further include: determining a fraud score for the IP address based at least in part on the likelihood; and determining whether to verify the electronic transaction submission based on the fraud score.

Other implementations may include one or more non-transitory computer readable storage media storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
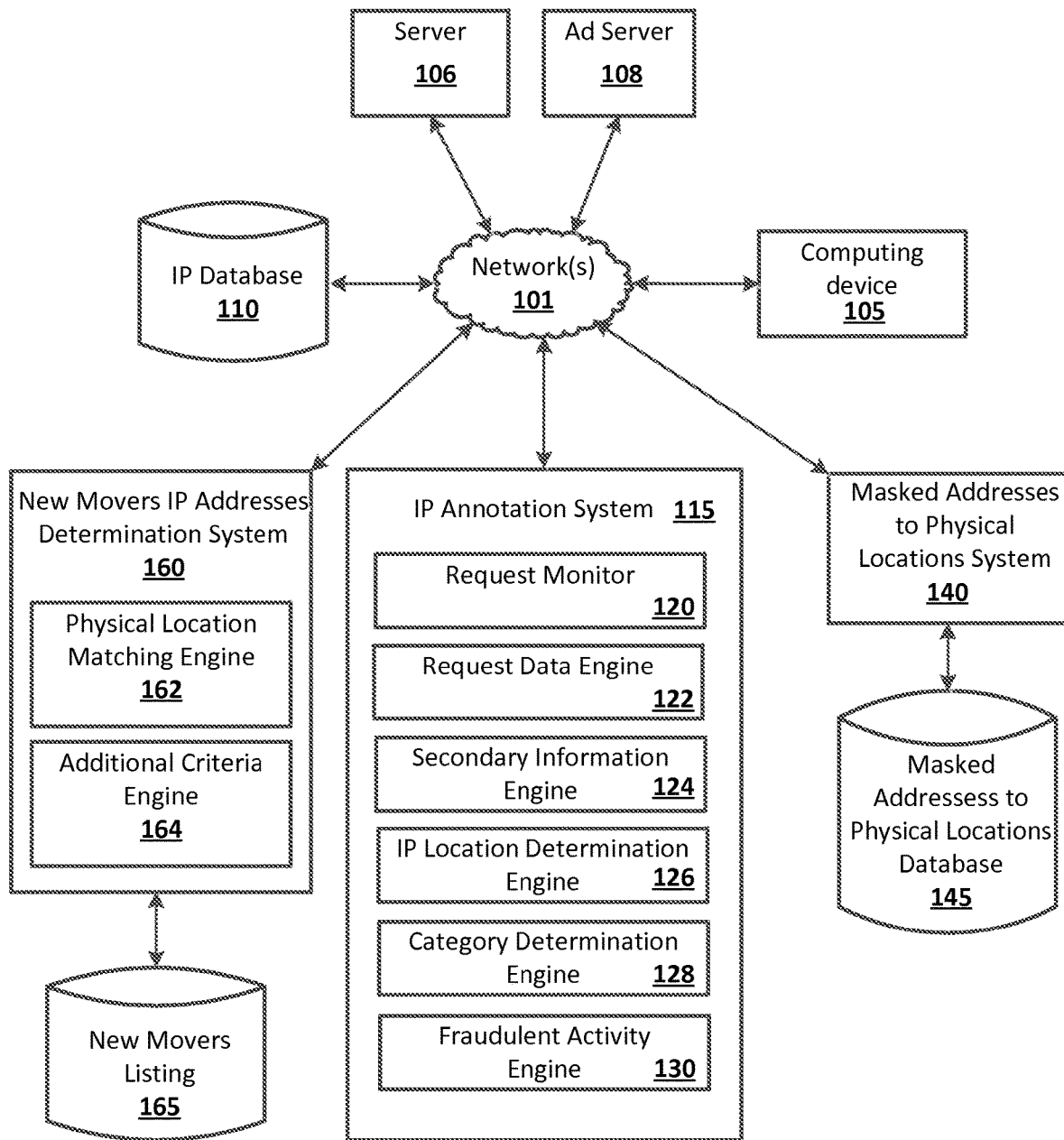
FIG. 1 illustrates an example environment in which one or more attributes of IP addresses may be determined and/or utilized.

FIG. 1 illustrates an example environment in which one or more attributes of IP addresses may be determined and/or analyzed. The example environment of FIG. 1 includes an IP annotation system 115, a computing device 105, a server 106, an ad server 108, an IP database 110, a masked addresses to physical locations system 140, a masked addresses to physical locations database 145, a new movers IP addresses determination system 160, and a new movers IP addresses determination system 160, and a new movers listing 165. The IP annotation system 115, the masked addresses to physical locations system 140, the new movers IP addresses determination system 160, and/or other components of the example environment may be implemented in one or more computers that communicate, for example, through one or more networks.

The IP annotation system 115, the masked addresses to physical locations system 140, and the new movers IP addresses determination system 160 are example systems in which the systems, components, and techniques described herein may be implemented and/or with which systems, components, and techniques described herein may interface. One or more aspects of the IP annotation system 115, the masked addresses to physical locations system 140, and/or the new movers IP addresses determination system 160 may be incorporated in a single system in some implementations. Also, in some implementations one or more components of the IP annotation system 115 and/or other components may be incorporated on the computing device 105 and/or the server 106. For example, all or aspects of request monitor 120 may be incorporated on the computing device 105 and/or on the server 106.

Figure 12:
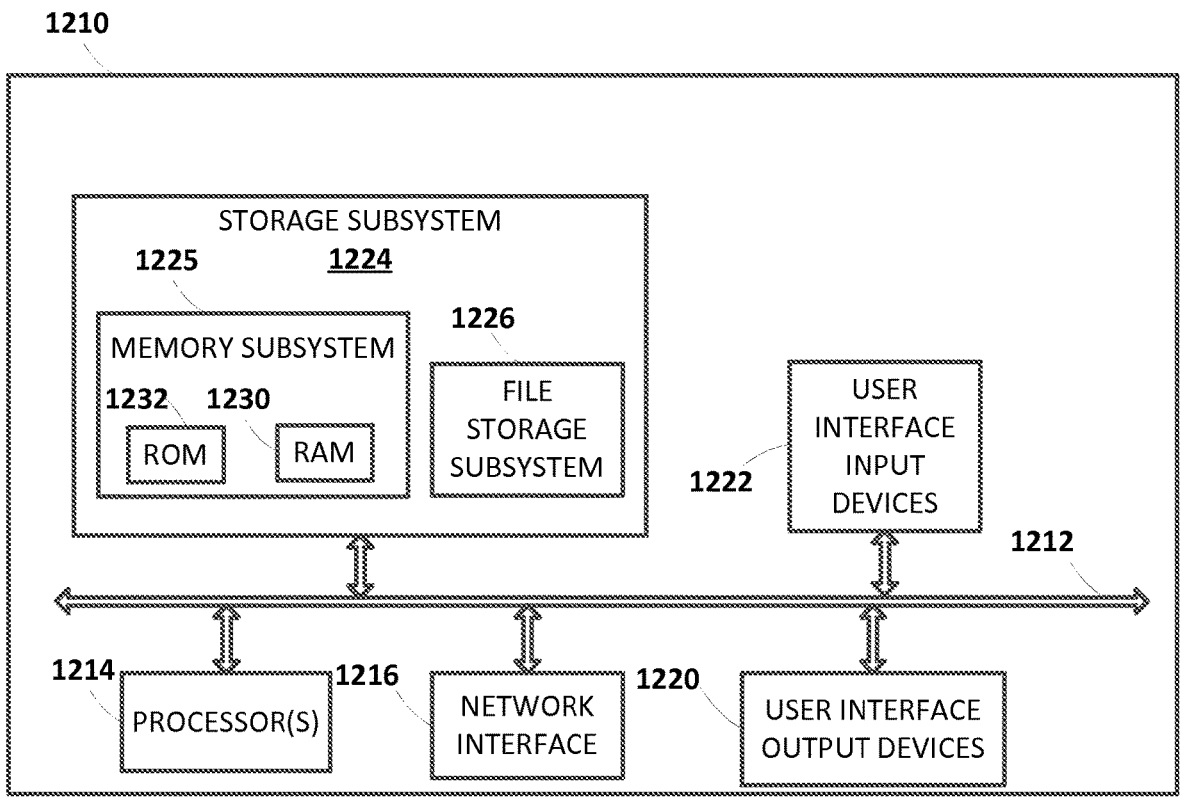
FIG. 12 illustrates an example architecture of a computer system.

The components of the example environment of FIG. 1 may each include memory for storage of data and software applications, a processor for accessing data and executing applications, and components that facilitate communication over a network. In some implementations, such components may include hardware that shares one or more characteristics with the example computer system that is illustrated in FIG. 12. The operations performed by one or more components of the example environment may optionally be distributed across multiple computer systems. For example, the steps performed by the IP annotation system 115 and/or the new movers IP addresses determination system 160 may be performed via one or more computer programs running on one or more servers in one or more locations that are coupled to each other through a network.

Generally, the IP annotation system 115 determines one or more attributes associated with an IP address, assigns the attributes to the IP address, and stores the IP address with the assigned attributes in IP database 110. In some implementations, IP annotation system 115 may determine a physical address for an IP address. In some implementations, IP annotation system 115 may determine a likelihood value that indicates likelihood an IP address is associated with a category. In some implementations, IP annotation system 115 may determine a fraud score that is indicative of likelihood that one or more electronic requests associated with the IP address are fraudulent.

In some implementations, likely categories, physical locations, and/or fraud scores determined by IP annotation system 115 for IP addresses may be utilized to identify whether and/or which content should be served to those IP addresses. For example, one or more attributes determined by IP annotation system 115 may be utilized by ad server 108 to determine which advertisements to provide in response to requests associated with an IP address based on a determined physical location and/or categories associated with the IP address. Additional description of the IP annotation system 115 is provided herein (e.g., FIGS. 2-9).

In this specification, the term "database" will be used broadly to refer to any electronic collection of data. The data of the database does not need to be structured in any particular way, or structured at all, and it can be stored on storage devices in one or more locations. Thus, for example, the IP database 110 may include multiple collections of data, each of which may be organized and accessed differently.

Also, in this specification, the term "entry" will be used broadly to refer to any mapping of a plurality of associated information items. A single entry need not be present in a single storage device and may include pointers or other indications of information items that may be present in unique segments of a storage device and/or on other storage devices. For example, an entry that identifies an IP address and a physical location in IP database 110 may include multiple nodes mapped to one another, with one or more nodes including a pointer to another information item that may be present in another data structure and/or another storage medium.

The computing device 105 may be, for example, a desktop computing device, a laptop computing device, a tablet computing device, and/or a mobile phone computing device. In some implementations, one or more applications may be executing on computing device 105 that may send electronic requests to one or more other computing devices via network 101. For example, a web browser may be executing on computing device 105 and the browser may send one or more electronic requests to be served web content. Requests may be provided to one or more computing devices, such as server 106. The server 106 may be one or more computing devices that may receive requests from one or more other computing devices, such as computing device 105, and provide results for the requests. For example, server 106 may store and provide one or more webpages, and computing device 105 may provide a request to server 106 to be provided with one or more of the webpages. Server 106 may utilize information included with requests, such as IP addresses, request data that is provided with the request, and/or cookie information, to provide one or more of the webpages and/or to determine content of provided webpages. In various implementations IP annotation system 115 may include a request monitor 120, a request data engine 122, a secondary information engine 124, an IP location determination engine 126, a category determination engine 128, and/or a fraudulent activity engine 130. In some implementations, all or aspects of engines 120, 122, 124, 126, 128, and/or 130 may be omitted. In some implementations, all or aspects of engines 120, 122, 124, 126, 128, and/or 130 may be combined. In some implementations, all or aspects of engines 120, 122, 124, 126, 128, and/or 130 may be implemented in a component that is separate from IP annotation system 115, such as computing device 105.

Generally, request monitor 120 identifies webpage requests, advertisement requests, transactional requests, and/or other requests that originate from computing devices (e.g., computing device 105). Each request includes request data that includes at least an IP address that is associated with that particular computing device. For example, each of one or more computing devices may provide requests for content to server 106, and each of the computing devices may have a unique IP address. The server 106 may forward the requests, directly or indirectly to request monitor 120 and/or request monitor 120 may be executing on the server 106. In some implementations, request monitor 120 may be executing on computing device 105 and may identify the request and provide the request information to one or more other components via network 101. For example, request monitor 120 may identify a user selecting a link on a webpage via a browser executing on computing device 105; and request monitor may provide the IP address of computing device 105, information related to the selected link, such as the URL of the requested webpage, and/or other request data provided with the request, such as cookie information.

In some implementations, request monitor 120 may be executing on a device that receives electronic requests, such as a server that receives requests from multiple IP addresses and provides requested webpages. For example, request monitor 120 may be executing on server 106, or an ad exchange system in communication with server 106, and may identify a request when computing device 105 requests a webpage that is stored on server 106. The IP address and other request data provided with each request, such as cookie information and/or user information, may be identified by request monitor 120 when computing device 105 provides the request.

As an example, a user may browse, utilizing computing device 105, to a commercial webpage that is provided by server 106. The user may select an item for purchase and provide personal information, such as name, mailing address, and/or credit card information as request data. After the request is complete, server 106 logs the IP address of the requesting computing device 105 with information related to the transaction. The log is forwarded to the request monitor 120. The request data engine 122 then selects potentially identifying information and forwards the information to one or more components.

Generally, request data engine 122 indexes and/or otherwise prepares the request data that is provided with requests. For example, computing device 105 may send a request for a webpage along with information regarding characteristics of computing device 105 and/or characteristics of the user that initiated the request. Request data may include, for example, user web names of the requesting user, one or more actual names of the requesting user, one or more street addresses associated with the requesting user and/or associated with the computing device 105, and/or one or more other indications of a location, such as a ZIP code, census block, and/or neighborhood. In some implementations, request monitor 120 and/or request data engine 122 may be provided, in whole or in part, on other computing systems (e.g., server 106) and one or more of the other computing systems may provide IP annotation system 115 with IP addresses and request data associated with those IP addresses.

Generally, secondary information engine 124 identifies secondary information from one or more databases. The secondary information is related to one or more IP addresses and may be utilized to determine one or more attributes described herein, such as an indication of the physical location of the IP addresses. For example, an ISP may assign IP addresses to customers based on geographic location, and secondary information engine 124 may identify one or more databases or network services provided by network operators or network data aggregators that includes potentially identifying information for each assigned IP address or subnet. In some implementations, particular IP addresses may be assigned regionally and secondary information engine 124 may identify one or more databases that include regional location information for ranges of IP addresses. For example, secondary information engine 124 may identify a database that includes information related to the range of IP addresses used in North America and/or used in particular states within the United States. Additional and/or alternative secondary information may be identified by secondary information engine 124, such as information from masked addresses to physical locations database 145 and/or other data described in examples herein.

Generally, IP location determination engine 126 determines a physical address to associate with an identified IP address. In some implementations, IP location determination engine 126 may receive request data from request data engine 122 and/or secondary information from secondary information engine 124 and determine a physical address to associate with the IP address based on the request data and/or secondary information. IP location determination engine 126 may assign the physical address to the IP address and store the IP address and assigned physical address in IP database 110.

In some implementations, IP location determination engine 126 may have access to proprietary information provided by a client and may utilize the information to determine a physical address to associate with an IP address. For example, request data engine 122 may identify a name of a user and an IP address from information included as request data with a request. Secondary information engine 124 may access a customer list of current and/or previous customers of a client to determine a physical address to associate with the IP address. For example, a client may maintain a database of names and addresses of customers and may provide IP annotation system 115 with access to the database. Request data engine 122 may provide the name of a user that is identified from request data provided with a request, and IP location determination engine 126 may access the database to determine a physical address from the customer list of the client based on the identified name. IP location determination engine 126 may store the physical address with the IP address in IP database 110.

Generally, the masked addresses to physical locations system 140 generates a mapping of masked IP addresses to numerical indications of physical locations associated with the IP addresses that were masked by one or more netmasks. For example, masked addresses to physical locations system 140 may identify a plurality of IP addresses from IP database 110, each associated with one or more physical locations. Masked addresses to physical locations system 140 may apply a netmask of "255.255.255.0" to the IP addresses, and associate the physical addresses with the resulting masked addresses. The generated mapping may be stored in the masked addresses to physical locations index 145. For example, the mapping may include, for a first masked address, a mapping to a first median ZIP code value and variance for that first masked address, and may include, for a second masked address, a mapping to a second median ZIP code value and variance for that second masked address. Each of the masked addresses may be mapped to additional and/or alternative numerical indications of physical locations such as census districts, voting districts, etc. Moreover, additional and/or alternative netmasks may be applied to the same set of IP addresses to result in different masked addresses. For example, an 8 bit netmask, a 16 bit netmask, a 24 bit netmask, and/or other sizes of netmasks such as 25 bit netmasks, and/or 124 bit netmasks (e.g. for IPv6 IP addresses) may be applied to a set of IP addresses, each resulting in different masked addresses associated with the physical addresses that are associated with the initial IP addresses. As described herein, in some implementations the mappings generated by the masked addresses to physical locations system 140 may be utilized by IP annotation system 115 and/or other components in determining one or more attributes of IP addresses. Additional description of the masked addresses to physical locations system 140 is provided herein (e.g., FIG. 9).

Generally, the new movers IP addresses determination system 160 determines IP addresses that are associated with physical locations with new occupants and stores an indication of those IP addresses in IP database 110 and/or other database. Ad server 108 and/or other component may provide advertisements tailored to new movers in response to IP request activity from one or more of the IP addresses that are determined to be associated with physical locations with new occupants—and may provide the advertisements based at least in part on the IP addresses being associated with physical locations with new occupants. For example, a home improvement store may desire to target an on-line advertisement campaign to new movers in a particular geographic region and ad server 108 may provide advertisements in response to request activity based on that request activity being associated with an IP address determined to be associated with a physical location with new occupants and based on the physical location being in the particular geographic region.

In various implementations the IP addresses determination system 160 may include a physical location matching engine 162 and an additional criteria engine 164. In some implementations, all or aspects of engines 162 or 164 may be omitted, combined, and/or implemented in a component that is separate from the IP addresses determination system 160. For example, in some implementations all or aspects of the IP addresses determination system 160 may be incorporated as part of IP annotation system 115.

Generally, the physical location matching engine 162 identifies, from new movers listing 165, a plurality of new mover physical locations that have new occupants and determines IP addresses with assigned physical locations that match new mover physical locations from the new movers listing 165. In some implementations, the physical location matching engine 162 may identify IP addresses and assigned physical locations from IP database 110 (e.g., the physical locations may be assigned to the IP addresses by IP location determination engine 126 and/or masked addresses to physical locations system 140 as described herein). The new movers listing 165 may be generated by a third party and includes a listing of new mover physical locations (e.g., particular street addresses and ZIP codes, census blocks, and/or other indications of locations) that have new occupants, and optionally additional data related to the new mover physical locations. The new movers listing may be generated based on various sources such as home sales data, services installation data (e.g., cable installation, phone installation), etc.

The physical location engine 162 may utilize exact matching and/or soft matching in determining physical locations assigned to IP addresses match new mover physical locations of the new movers listing 165. For example, a first IP address may be assigned, in IP database 110, to a physical location that is a street address and ZIP code—and the engine 162 may determine an exact match between the assigned physical location and a new mover physical location of the new movers listing 165 based on the new mover physical location having the same street address and ZIP code. Also, for example, a second IP address may be assigned, in IP database 110, to a physical location that is a census block—and the engine 162 may determine a soft match between the assigned physical location and a new mover physical location of the new movers listing 165 based on the new mover physical location being associated with the same census block. In some implementations, the new mover physical location may itself include the census block. In some other implementations, the new mover physical location may not include the census block and the engine 162 may determine the census block based on the new mover physical location of the new movers listing 165 (e.g., the new mover physical location may be a particular street address and ZIP code and the census block may be identified based on a database mapping between the census block and the street address and ZIP code).

Generally, the additional criteria engine 164 determines, for at least one or more (e.g., all) of the IP addresses determined by engine 162 to have assigned physical locations that match new mover physical locations of the new movers listing 165, a set of the IP addresses that have one or more corresponding additional attributes that satisfy at least one criterion. The additional attributes and the at least one criterion can be selected to provide additional assurance that IP addresses determined by engine 162 are associated with "new movers." For example, the additional assigned attributes for each of the IP addresses may include an IP address discovery timestamp (an indicator of when the IP address was discovered in use) and the at least one criterion may be a temporal threshold (e.g., that the discovery timestamp indicates discovery within the last month, within the last week, or within the last 3 days). Also, for example, the additional assigned attributes for each of the IP addresses may additionally and/or alternatively include a residential likelihood that the IP address is associated with a residential location (e.g., as described herein with respect to category determination engine 128) and the at least one criterion may be a likelihood threshold. As yet another example, the additional assigned attributes for each of the IP addresses may additionally and/or alternatively include connection speed indication that indicates a connection speed of the IP address and the at least one criterion may be a threshold connection speed (e.g., to ensure the connection speed is a speed likely to be associated with a residential location).

The set of the IP addresses determined by the additional criteria engine 164 can be included by the system 160 in a group of IP addresses that are "new mover" IP addresses that are associated with physical locations with new occupants. In some implementations, the additional criteria engine 164 makes determinations for all of the IP addresses determined by engine 162 to have assigned physical locations that match new mover physical locations of the new movers listing 165, and the set determined by additional criteria engine 162 is the only set utilized to determine the group. In some implementations, exact matches from the engine 162 are included in the group without further analysis by engine 164, the engine 164 makes determinations for only IP addresses with "soft matches" determined by engine 162, and the set of the IP addresses determined by engine 164 are also added to the group. In yet other implementations, the engine 164 makes a first set of determinations for exact matches from the engine 162 and the engine 164 makes a second set of more rigorous determinations IP addresses with "soft matches" determined by engine 162, and the set of the IP addresses determined by engine 164 are included in the group.

In some implementations, the physical location matching engine 162 determines IP addresses with assigned physical locations that match new mover physical locations of the new movers listing 165 and provides one or more of those IP addresses to additional criteria engine 164 to enable the engine 164 to determine IP addresses for inclusion in the group based on those IP addresses being associated with additional attributes that satisfy one or more criterion. However, it is noted that in some implementations the engine 162 and engine 164 may be combined and/or work in concert—and/or the engine 164 may make one or more determinations prior to the engine 162 and provide the set to engine 162. For example, in some implementations the engine 164 may first determine a set of the IP addresses that each include an IP address discovery timestamp that satisfies a temporal threshold (e.g., that the discovery timestamp indicates discovery within the last month, within the last week, or within the last 3 days). The engine 164 may then provide the set of the IP addresses to the physical location matching engine 162 and those IP addresses determined by engine 162 to have assigned physical locations that match new mover physical locations of the new movers listing 165 may be included by the system 160 in a group of IP addresses that are "new mover" IP addresses that are associated with physical locations with new occupants. As yet another example, engine 162 and 164 may work in concert to determine a group of IP addresses that have assigned physical locations that match new mover physical locations of new movers listing 165 and that have one or more additional attributes that satisfy at least one criterion.

In some implementations, the system 160, the ad server 108, and/or other component may further restrict the group of IP addresses based on one or more additional advertisement criteria. For example, an advertisement campaign may only target a particular geographic region and only IP addresses that have assigned physical locations encompassed by that particular geographic region may be included in the group. Additional description of the new movers IP addresses determination system 160 and engines 162 and 164 is provided below (e.g., FIGS. 10 and 11).

Computing device 105 may request to be served a webpage and server 106 may serve the webpage based on request data that is provided with the request and/or from cookie information that is stored by the browser of computing device 105. While it is understood that multiple users will interact with components of FIG. 1 via multiple client devices, for the sake of brevity, certain examples described in this disclosure may focus on a single user operating the client device 105.

The ad server 108 may be in communication with one or more servers, such as server 106, and may provide one or more advertisements to serve along with content served by server 106 in response to a request. The ad server 108 may serve the advertisements to the computing device 105 directly and/or may provide the advertisement to the server 106 which, in turn, may provide the advertisement to the computing device 105. In some implementations, ad server 108 may receive a request from server 106 to provide an ad, and server 106 may provide ad server 108 with request information related to the webpage requester. In some implementations, an ad exchange system may optionally be functionally interposed between server 106 and ad server 108 to facilitate exchange of information and to enable multiple ad servers to bid on one or more ads to be served responsive to content request to server 106 and/or other servers.

As one example, server 106 may receive a request for a webpage from computing device 105. The requested webpage may include an advertising space, and server 106 may provide an ad exchange system with a request for an advertisement. Ad exchange system may provide multiple ad servers with requests for bid to provide an advertisement to computing device 105 in response to the received request. The requests for bid may optionally include an IP address associated with the computing device 105 and ad server 108 may determine whether to bid and/or what amount to bid based on one or more determined attributes for that IP address (e.g., based on one or more attributes determined by IP annotation system 115).

Figure 2:
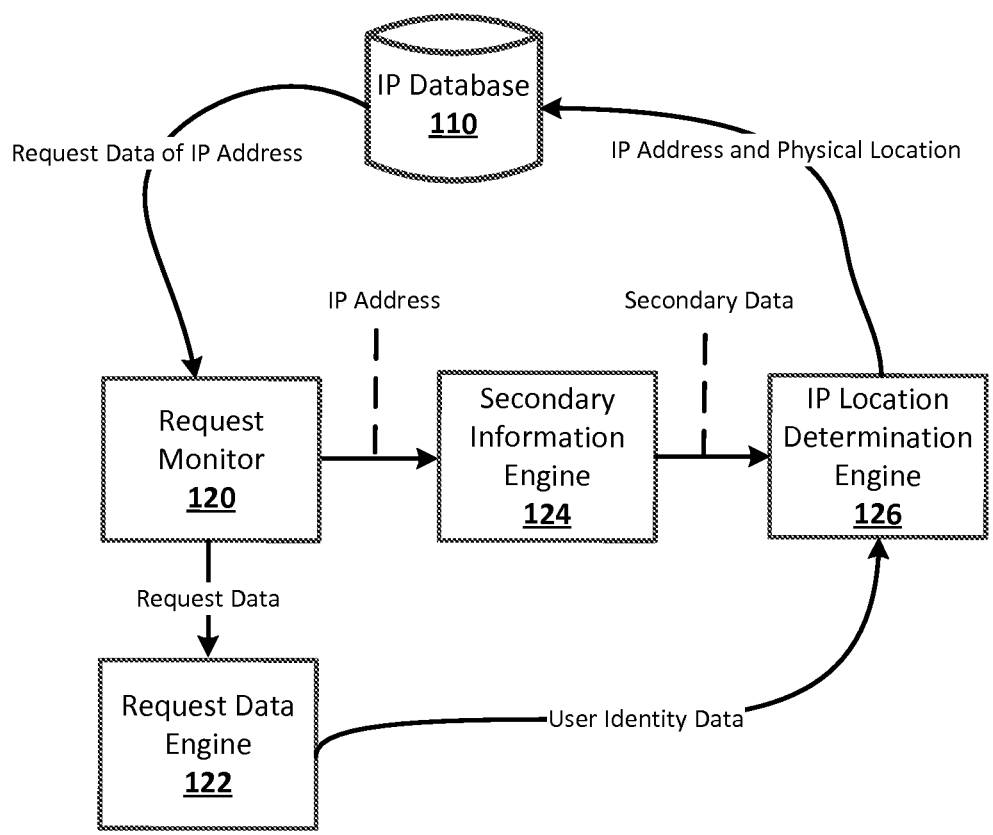
FIG. 2 illustrates an example of determining a physical address to associate with an IP address.

FIG. 2 illustrates an example of determining a physical address to associate with an IP address. The example illustrates the flow of information between sub-engines of the IP annotation system 115 and the IP database 110. To aid in explaining the example of FIG. 2, it will be described in the context of a request originating from computing device 105 and directed to server 106.

Initially, request monitor 120 identifies one or more IP request activities. The IP request activities may be electronic requests originating from computing device 105 and/or may include multiple requests originating from computing device 105 and/or from other computing devices having the same IP address. For example, request monitor 120 may identify five requests for webpages from an IP address of "111.111.111.111" that may all originate from computing device 105 and/or that may originate from one or more computing devices connected to a network and utilizing the same gateway IP address.

In some implementations, one or more of the requests may be provided by computing device 105 with request data. Request monitor 120 may provide and request information that is provided with a request to request data engine 122. Request data engine 122 may receive the request information and identify request data that may be utilized by one or more other component of IP annotation system 115. For example, one or more of the requests originating from computing device 105 may include user credentials of the user that initiated the request, such as a web name of the user and/or one or more actual names of the user. Request data engine 122 may identify the credentials and provide the credentials as request data to IP location determination engine 126 to further determine a physical address to associate with "111.111.111.111." Also, for example, request monitor 120 may identify a request that is provided in conjunction with cookie information that was previously provided to computing device 105. Request data engine 122 may utilize the cookie information to identify request data and provide the request data to IP location determination engine 126.

Request monitor 120 may provide secondary information engine 124 with an IP address that is associated with one or more requests, and secondary information engine 124 may identify, for example, one or more mappings of IP addresses to secondary available information. The secondary available information may include, for example, publicly available databases of IP addresses and current lessees of the IP addresses, proprietary databases of one or more ISPs, and/or other databases that include identifying information of users and physical addresses associated with the users. In some implementations, the secondary available information may be identified from the request. For example, secondary information engine 124 may identify a trace route for a request and utilize location information included with the trace route as secondary available information.

IP location determination engine 126 may receive request data from request data engine 122 that includes identifying information of one or more users that have initiated electronic requests from computing device 105. In some implementations, secondary information engine 124 may provide IP location determination engine 126 with physical location information related to the IP address associated with the IP request activity 102. In some implementations, IP location determination engine 126 may determine a physical location to associate with the IP address based on the matching location information received from secondary information engine 124, the request data received from request data engine 122, and/or one or more other mappings of users to physical locations. For example, IP location determination engine 126 may identify transaction data that includes user names mapped to physical addresses. IP location determination engine 126 may utilize the user identity data that was identified by request data engine 122 (i.e., information related to a user that is associated with the IP address) to identify a physical address of the user that is identified by the user identity data, and determine a physical location of the IP address based on the identified physical address of the user.

IP location determination engine 126 may utilize the matching location information to verify that the address is correct and/or to disambiguate two potential matches. For example, user identity data may include information related to a "John Smith" and IP location determination engine 126 may identify an address for a John Smith in New York and a John Smith in Los Angeles. The matching location information may include an indication that the IP address is located in the western United States, and IP location determination engine 126 may determine a physical location for the IP address that is the physical address of John Smith in Los Angeles based on the matching location information.

In some implementations, the secondary information engine 124 may identify secondary information from the masked addresses to physical locations database 145. The IP location determination engine 126 may utilize such information to determine and/or verify a physical location for an IP address. For example, secondary information engine 124 may identify one or more masked addresses in masked addresses to physical locations database 145, identify one or more physical locations associated with the identified masked address or addresses, and associate physical locations associated with the identified masked addresses with the IP address.

As an example, secondary information engine 124 may be provided with an IP address of "123.456.789.4." Secondary information engine 124 may apply one or more netmasks to the IP address, and identify matching addresses in masked addresses to physical locations database 145. For example, secondary information engine 124 may apply a netmask of "255.255.255.0," resulting in a masked address of "123.456.789.0" and/or secondary information engine 124 may apply a netmask of "255.255.0.0," resulting in a masked address of "123.456.0.0."

Figure 3:
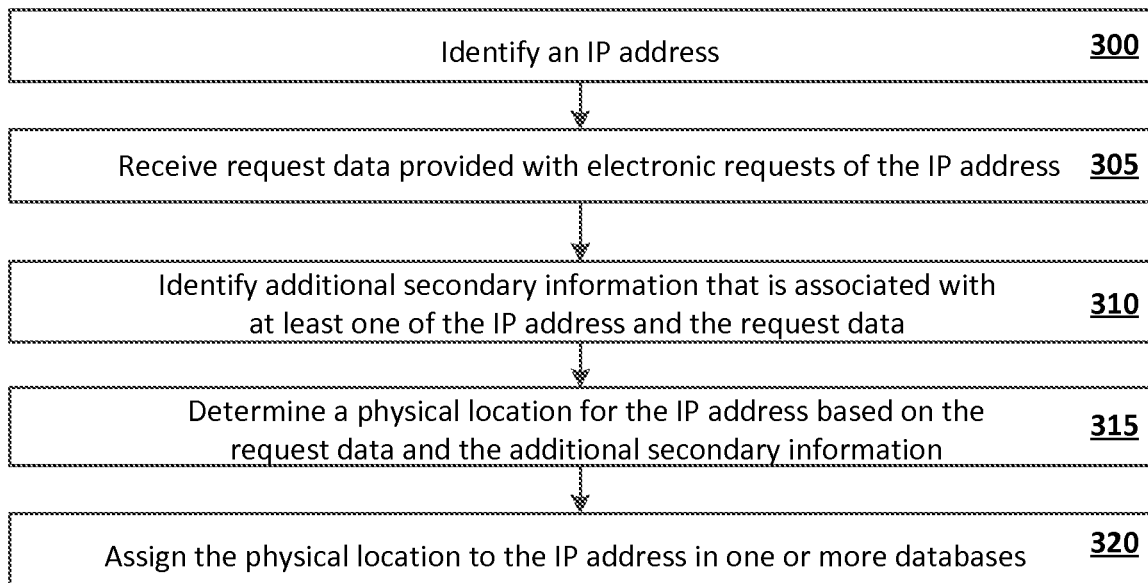
FIG. 3 is a flow chart of an example method for determining a physical address to associate with an IP address.

FIG. 3 is a flow chart of an example method for determining a physical address to associate with an IP address. Other implementations may perform the steps in a different order, omit certain steps, and/or perform different and/or additional steps than those illustrated in FIG. 3. For convenience, aspects of FIG. 3 will be described with reference to one or more components of FIG. 1 that may perform the method, such as IP annotation system 115.

At step 300, an IP address is identified. The IP address may be identified by a component that shares one or more characteristics with request monitor 120. In some implementations, the request monitor 120 may identify an IP address from an electronic request sent by a computing device. For example, computing device 105 may provide a request for a webpage to server 106 and request monitor 120 may identify the IP address of computing device 105 from the request.

At step 305, request data associated with electronic requests are received. The request data may include, for example, information included with cookies provided with a request and/or additional data submitted with the request, such as user information and/or computing device information. In some implementations, request data may be identified by a component that shares one or more characteristics with request data engine 122. For example, request data engine 122 may identify a reference to user information provided in request data.

At step 310, additional secondary information that is associated with the IP and the request data is identified. The additional secondary information may include one or more databases that include mappings of one or more user with one or more physical addresses. For example, secondary information engine 124 may identify a database that includes names and addresses of current and/or previous customers. In some implementations, secondary information engine 124 may identify trace route information from a request as available secondary information. For example, secondary information engine 124 may identify physical locations of the origin and/or path of a request as secondary information.

At step 315, a physical location for the IP address is determined based on the request data and the additional secondary information. The physical location may be determined by a component that shares one or more characteristics with IP location determination engine 126. In some implementations, IP location determination engine 126 may receive request data from request data engine 122 and/or secondary information from secondary information engine 124 and determine a physical address to associate with the IP address based on the request data and/or secondary information. IP location determination engine 126 may assign the physical address to the IP address and store the IP address and assigned physical address in IP database 110.

In some implementations, the secondary information may include a mapping of one or more user attributes to one or more physical addresses, and IP location determination engine 124 may determine a physical address to associate with the IP address based on the user attribute. For example, request monitor 120 may identify a request that includes an IP address associated with request data of "John Smith." Secondary information engine 124 may identify a customer list that includes a mapping of "John Smith" to the ZIP code "40208." IP location determination engine 128 may determine a physical address of "40208" for the IP address based on the identified request data and the secondary information.

In some implementations, the secondary information may include trace route information for the request, and IP location determination engine 124 may determine a physical location for an IP address based on the trace route data. For example, request monitor 120 may identify a request and secondary information engine 124 may identify trace route information for the request, the trace route information including indications of one or more computing devices that handled the request between the initiating device and the receiving device. In some implementations, the trace route information may be utilized to determine a physical location to associate with an IP address and/or to verify an existing IP address that is associated with an IP address.

At step 320, the physical location is assigned to the IP address in one or more databases. The physical location may be assigned to a database that shares one or more characteristics with IP database 110. In some implementations, the physical location and IP address may be stored in a database by a component that shares one or more characteristics with IP location determination engine 126.

In some implementations, IP annotation system 115 may determine one or more categories to associate with an IP address. For example, an IP address may be for a residential computing device, a commercial computing device, and/or the IP address may be publicly accessible to multiple users. IP annotation system 115 may determine a likelihood value that is indicative of whether an IP address matches one or more categories, and the determined likelihood value may be utilized to determine whether future activity from that IP address is fraudulent.

In some implementations, request monitor 120 may identify multiple requests from IP addresses. For example, request monitor 120 may identify incoming requests and store request data that is provided in conjunction with each request in IP database 110. Request data may include, for example, the time of day for each request, the duration of each request, the particular webpage that was requested, cookies provided with requests, and/or other information related to incoming requests.

Category determination engine 128 determines one or more categories that may be associated with an IP address. In some implementations, category determination engine 128 may receive activity data related to one or more IP addresses from request monitor 120 and/or may identify one or more previous requests in IP database 110 that have been annotated with physical location information and/or other information that has been identified by request data engine 122 from request data associated with the requests (e.g., user names, credit card information, computer specifications). For example, category determination engine 128 may identify a plurality of previously identified requests from "111.111.111.111" for one or more webpages. Request monitor 120 may store the requests and request data in IP database 110, and category determination engine 128 may later identify the requests. For example, category determination engine 128 may identify the plurality of requests associated with an IP address of "111.111.111.111," request data engine 122 may identify the request data associated with each of the requests, and category determination engine 128 may determine one or more categories to associate with the IP address based on the request data and/or based on one or more available secondary information sources identified by secondary information engine 124.

In some implementations, category determination engine 128 may determine a category of "residential" to associate with an IP address and further determine a likelihood value that is indicative of likelihood that the IP address is a residential address. For example, category determination engine 128 may determine whether requests originating from an IP address are characteristic of activity from a home and/or from a personal device of a user. In some implementations, category determination engine 128 may determine a likelihood value that is indicative of likelihood that an IP address is a commercial entity. For example, category determination engine 128 may determine a likelihood that an IP address is for a business and/or that the IP address is a hotspot of a business that is accessible by multiple devices.

In some implementations, category determination engine 128 may determine a category of an IP address based on previous activity from the IP address. For example, category determination engine 128 may determine that an IP address is likely a residential device if the number of requests from the IP address is below a threshold number of requests. Also, for example, category determination engine 128 may determine that an IP address is likely a commercial address if the number of requests from the address exceeds a threshold number of requests.

In some implementations, category determination engine 128 may determine a likelihood that an address is residential and/or commercial based on times associated with traffic from the address. For example, category determination engine 128 may determine that an address is more likely a residential address than a commercial address if requests originating from the IP address occur at times that are indicative of residential use, such as between 5 pm and 11 pm. Also, for example, category determination engine 128 may determine that an address is more likely a commercial IP address if requests are most frequent between 9 am and 5 pm.

In some implementations, the requests identified by request monitor 120 may be from multiple devices utilizing the same IP address as a gateway IP address. For example, an IP address may be for a network of multiple devices and/or the IP address may be accessible to multiple devices, such as a public hotspot. Category determination engine 128 may identify that the requests were from multiple devices that are unrelated (e.g., associated with users with different names, users associated with different physical location), and determine a likelihood score that the IP address is a public Wi-Fi location based on the identified requests.

In some implementations, request data engine 122 may identify requests from multiple users from the same IP address. For example, computing device 105 may be a computer that is accessible to multiple users, each with their own account. In some implementations, category determination engine 128 may determine that an address is residential and/or commercial based on the request data associated with the requests. For example, category determination engine 128 may determine that an IP address is likely a residential address if request data engine 122 identifies multiple requests that are associated with users with the same last name. Also, for example, category determination engine 128 may determine that an address is a commercial address based on identifying that the users utilizing the IP address have different last names.

In some implementations, category determination engine 128 may determine that an address is residential and/or commercial based on device information of the device and/or devices that are associated with the IP address. For example, category determination engine 128 may identify that multiple mobile devices have utilized an IP address and determine that the IP address is likely that of a gateway for a private network of a business.

In some implementations, category determination engine 128 may determine that an address is commercial and/or residential based on a physical address associated with the IP address in the IP database 110. For example, request data engine 122 may identify address data that is associated with an IP address, and secondary information engine 124 may identify a database that includes a name associated with the same address, such as a telephone directory. Based on the type of entity associated with the address (i.e., a business versus a person), category determination engine 128 may determine a likely category to associate with the IP address.

In some implementations, request data may include information related to the devices that submitted requests and/or the connection of the devices, and category determination engine 128 may determine a likely category for an IP address based on the connection and/or computing device information. For example, request data associated with one or more requests from an IP location may include connection speed of network 101, and category determination engine 128 may determine that an IP address is likely co-located within a datacenter rather than end-user-facing if the connection speed is above a threshold level, and more likely fraudulent. For example, category determination engine 128 may determine that a request associated with a connection speed of 10 Mbps is 99% likely to be end-user-facing, a connection speed of 100 Mbps is 1% likely to be end-userfacing, and a connection speed of 1000 Mbps is 0.1% likely to be an end-user-facing IP address.

Figure 4:
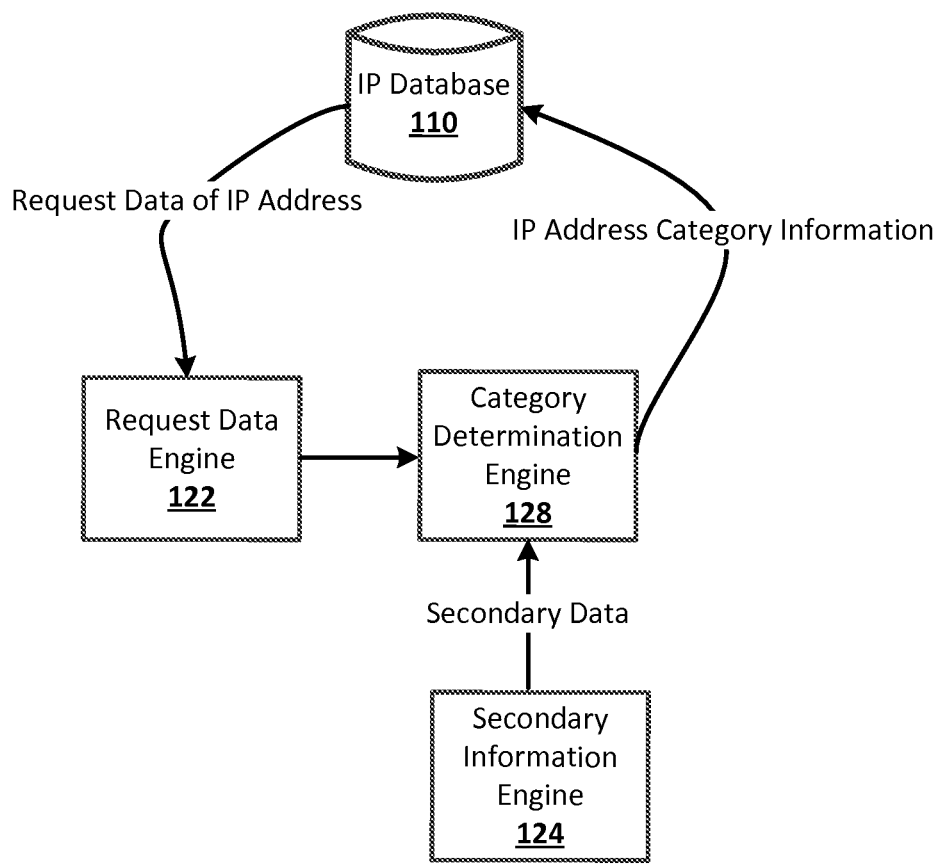
FIG. 4 illustrates an example of determining a likelihood value that is indicative of a category being associated with an IP address.

FIG. 4 illustrates an example of determining a likelihood value that is indicative of a category being associated with an IP address. The example illustrates the flow of information between sub-engines of the IP annotation system 115 and the IP database 110. To aid in explaining the example of FIG. 4, it will be described in the context of a plurality of requests that are stored in IP database 110 with request data and/or other information.

Request data engine 122 may identify one or more of a plurality of IP addresses from IP database 110. In some implementations, the IP addresses may be associated with a physical location, one or more users that are associated with the IP address, and/or other information that may be determined from request data from requests previously identified as originating from an IP address. For example, request data engine 122 may identify 10 previous requests from the IP address "111.111.111.111" in IP database 110, and request data engine 122 may further identify request data for each of the requests and/or annotations of information that was previously identified and/or determined from request data associated with the requests. Also, for example, one or more identified IP addresses may be associated with a physical address, as described herein.

Request data engine 122 may provide information to category determination engine 128 based on the identified request data associated with the requests from an IP address. In some implementations, the information may be related to the users and/or computing devices provided requests (user names, computing device type, internet connection speed, etc.). In some implementations, the information may be related to the requests, such as time of day of the requests, duration of the requests, and/or requested webpage.

In some implementations, category determination engine 128 may identify one or more categories that may be associated with a given IP address. For example, category determination engine 128 may identify one or more criteria that are indicative of an IP address being residential, criteria that are indicative of an IP address being commercial, and/or criteria that are indicative of an IP address being publicly available.

In some implementations, category determination engine 128 may determine a likelihood value for one or more categories for an IP address. For example, category determination engine 128 may determine a likelihood value that an IP address is a residential address, a likelihood value that an IP address is a commercial address, a likelihood value that an IP address is a public Wi-Fi hotspot, and/or a likelihood value that an IP address is fraudulent. For each of the categories, category determination engine 128 may determine a value based on one or more identified factors. For example, category determination engine 128 may determine a likelihood value that is indicative of likelihood of an IP address is residential based on times of requests, last names of users associated with requests, ZIP codes associated with requests, and/or one or more other factors. Category determination engine 128 may determine a likelihood score and store the likelihood score with the IP address in IP database 110. For example, category determination engine 128 may determine that an IP address is 90% likely a residential location, 10% likely a commercial IP address, 30% to be a publicly available hotspot, and 5% likely to be a fraudulent IP address.

Figure 5:
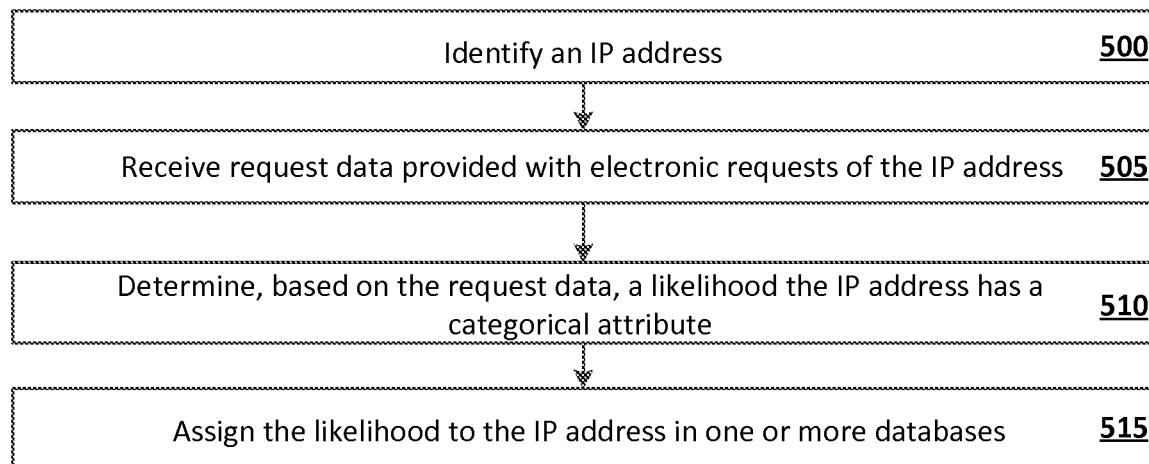
FIG. 5 is a flow chart of an example method of determining a likelihood value for an IP address category.

FIG. 5 is a flow chart of an example method of determining a likelihood value for an IP address category. Other implementations may perform the steps in a different order, omit certain steps, and/or perform different and/or additional steps than those illustrated in FIG. 3. For convenience, aspects of FIG. 3 will be described with reference to one or more components of FIG. 1 that may perform the method, such as IP annotation system 115.

At step 500, an IP address is identified. The IP address may be identified by a component that shares one or more characteristics with request monitor 120 and/or may be identified via IP database 110. In some implementations, step 500 share may share one or more characteristics with step 300 of FIG. 3.

At step 505, request data that is provided with electronic requests of the IP address is received. The request data may be received by request monitor 120 and/or may be identified via IP database 110. In some implementations, step 505 may share one or more aspects with step 305 of FIG. 3.

At step 510, a likelihood that the IP address has a categorical attribute is determined. For example, category determination engine 128 may identify one or more criteria that are indicative of an IP address being residential, criteria that are indicative of an IP address being commercial, and/or criteria that are indicative of an IP address being publicly available. In some implementations, the likelihood may be determined based on request data that is associated with one or more of the identified requests from the IP address.

For example, a plurality of request for an IP address may be identified from IP database 110, each associated with request data indicating an actual name of a user. In some implementations, category determination engine 128 may determine a likelihood of the IP address being residential by determining a count of requests that include the same associated surname. For example, category determination engine 128 may identify ten requests, eight of which are associated with a surname of "Smith." Category determination engine 128 may determine a likelihood that the IP address is residential that is more indicative of likelihood than a second address that is associated with requests that indicate different last names for the requests.

At step 515, the likelihood is assigned to the IP address in one or more databases. The IP address and assigned likelihood may be stored in one or more databases, such as IP database 110. In some implementations, IP database 110 may already include an entry for the IP address, and category determination engine 128 may associate the likelihood to the existing entry. For example, category determination engine 128 may identify an entry in IP database 110 for an IP address that is assigned a likelihood for the IP address being a commercial address. Category determination engine 128 may create a new entry for the IP address and a likelihood for a second category and/or category determination engine 128 may associate the second likelihood with the existing entry.

In some implementations, IP annotation system 115 may determine a fraud score to associate with one or more IP addresses and/or netmasks. For example, fraudulent activity engine 130 may identify one or more requests originating from an IP address of "111.111.111.111," and determine a fraud score based on request data associated with the requests. For example, fraudulent activity engine 130 may determine a fraud score based on identifying previous requests that resulted in a charge-back of a credit card transaction, ad click-through rates from the IP address, and/or inconsistent physical location information between a physical location determined as described herein and location information identified from request data.

In some implementations, a fraud score that is associated with an IP address may be utilized to determine the likelihood that a future identified request is fraudulent. For example, fraudulent activity engine 130 may identify an incoming request, identify an entry in IP database 110 that matches the incoming request IP address and/or is a masked address that matches the IP address of the incoming request, and fraudulent activity engine 130 may determine whether the request is likely fraudulent based on a fraud score associated with the IP address and/or masked address in one or more databases.

In some implementations, fraudulent activity engine 130 may determine a fraud score for an IP address based on a history of charge-backs of credit cards resulting from requests from the IP address. For example, fraudulent activity engine 130 may demine a fraud score that is indicative of a fraudulent IP address if more than a threshold number of credit card transactions resulted in charge-backs. In some implementations, a fraud score may be determined for an IP address based on the type and/or volume of activity from the IP address. For example, fraudulent activity engine 130 may determine a fraud score for an IP address that is indicative of the IP address being fraudulent if a history of a threshold number of ad click-throughs is identified for the IP address.

In some implementations, a physical address may be determined for an IP address and a fraud score may be determined based on the physical address. For example, a physical address of an IP address may be determined as described herein fraudulent activity engine 130 may determine a fraud score based on the physical location. For example, fraudulent activity engine 130 may determine a fraud score for an IP address that is more indicative of likely fraud for an IP address that is associated with a region and/or network known to be the source of fraudulent internet activity than an IP address associated with a region and/or network that is not as known for fraudulent activity.

In some implementations, fraudulent activity engine 130 may determine a fraud score based on the number of different physical locations that are associated with the IP address. For example, fraudulent activity engine 130 may identify that an IP address is associated with 500 different physical locations based on previous requests originating from the IP address, and fraudulent activity engine 130 may further identify that the IP address is likely a residential address based on one or more categories associated with the IP address. Based on the residential category and the number of physical locations, fraudulent activity engine 130 may determine a fraud score that is indicative of fraud if the number of locations associated with requests from a residential location is likely fraudulent.

In some implementations, fraudulent activity engine 130 may determine whether a new request is likely fraudulent based on a determined fraud score associated with the IP address in IP database 110. For example, an incoming request from an IP address may be associated with request data that indicates a location, such as credit card payment information. Fraudulent activity engine 130 may identify the IP address in IP database 110 and further identify a physical location and a fraud score associated with the IP address. Based on similarity between the location of the request and the location associated with the IP address, and based on the fraud score, fraudulent activity engine 130 may determine a score for the request that is indicative of the fraudulent nature of the request. For example, a first IP address may be associated with a location in Indiana and a fraud score that is indicative of a low likelihood of fraud. A request from the first IP address may be associated with a location in Texas and fraudulent activity engine 130 may determine a score that is less indicative of fraud for the request from the first IP address than a second request with request data indicating a physical location of China. Also, for example, fraudulent activity engine 130 may determine a likelihood of fraud for a third request that includes Texas from an IP address that is associated with Indiana if the fraud score is more indicative of likely fraud than the fraud score associated with the first IP address.

Figure 6:
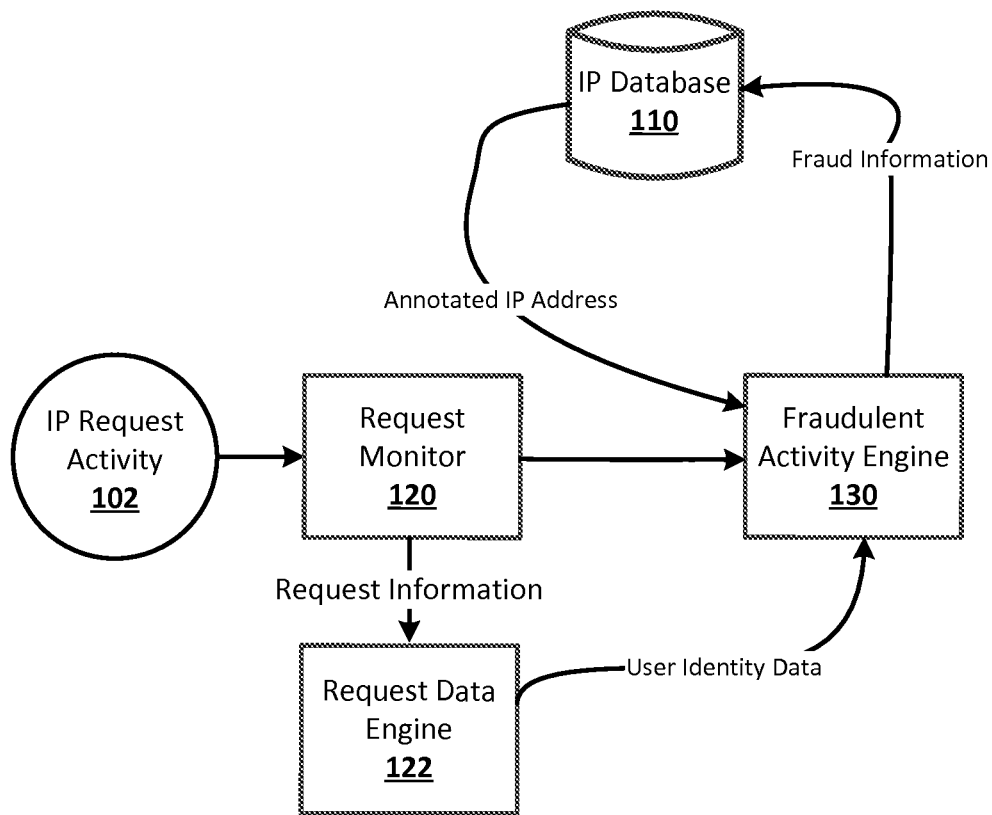
FIG. 6 illustrates an example of determining likelihood that activity from an IP address is fraudulent.

FIG. 6 illustrates an example of determining likelihood that activity from an IP address is fraudulent. Request monitor may identify an incoming request and provide request information associated with the request to request data engine 122, which may identify user identity data that is associated with the request. Request data engine 122 may provide fraudulent activity engine 130 with user information, such as name, location, computing device information related to the computing device that is providing the request, and/or other request data as described herein. Fraudulent activity engine 130 may identify an IP address in IP database 110 that is annotated with a fraud score, physical location, one or more likely categories, and/or fraud data that is indicative of past charge-backs and/or ad click-through rates. Fraudulent activity engine 130 may then determine a score for the request that is indicative of likelihood that the request is fraudulent. In some implementations, fraudulent activity engine 130 may not identify the IP address in IP database 110 and may determine fraud information and/or a fraud score for the IP address and store the IP address with the fraud score in IP database 110 for later use with other requests from the IP address.

Figure 7:
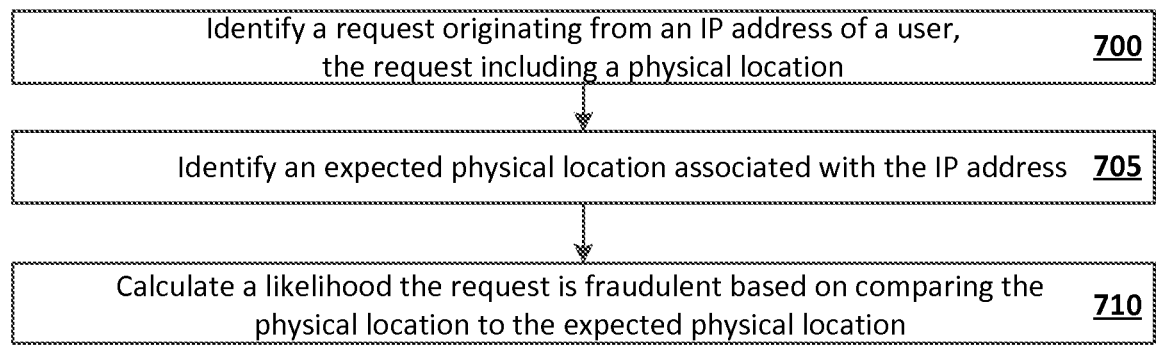
FIG. 7 is a flow chart of an example method of determining whether activity from an IP address is fraudulent.

FIG. 7 is a flow chart of an example method of determining whether activity from an IP address is fraudulent. Other implementations may perform the steps in a different order, omit certain steps, and/or perform different and/or additional steps than those illustrated in FIG. 7. For convenience, aspects of FIG. 7 will be described with reference to one or more components of FIG. 1 that may perform the method, such as IP annotation system 115.

At step 700, a request originating from an IP address of a user is identified. The request may include a physical location. The request may be identified by a component that shares one or more characteristics with request monitor 120. The physical location may be identified based on, for example, information entered by the user, information identified based on request data provided with the request, and/or trace route information.

At step 705, an expected physical location associated with the IP address is identified. The expected location may be identified via IP database 110 by a component that shares one or more characteristics with fraudulent activity engine 130. For example, request monitor may identify a request emanating from an IP address and fraudulent activity engine 130 may identify one or more entries in IP database 110 for that IP address. Also, for example, fraudulent activity engine 130 may identify one or more masked addresses that match the IP address in masked addresses to physical locations database 145.

At step 710, a likelihood that the request is fraudulent is calculated. The likelihood may be calculated based on comparing the physical location from the IP request to the expected physical location associated with the IP address. In some implementations, the likelihood may be determined based on similarity between the physical location of the request and the expected physical location. For example, the physical location associated with a request may be "12345" and the expected location may be "12356," and fraudulent activity engine 130 may determine a likelihood based on, for example, a numerical distance between the locations, a spatial distance between locations associated with the ZIP codes, and/or one or more other methods to determine a likelihood that the differences between the locations is indicative of fraudulent activity.

Figure 8:
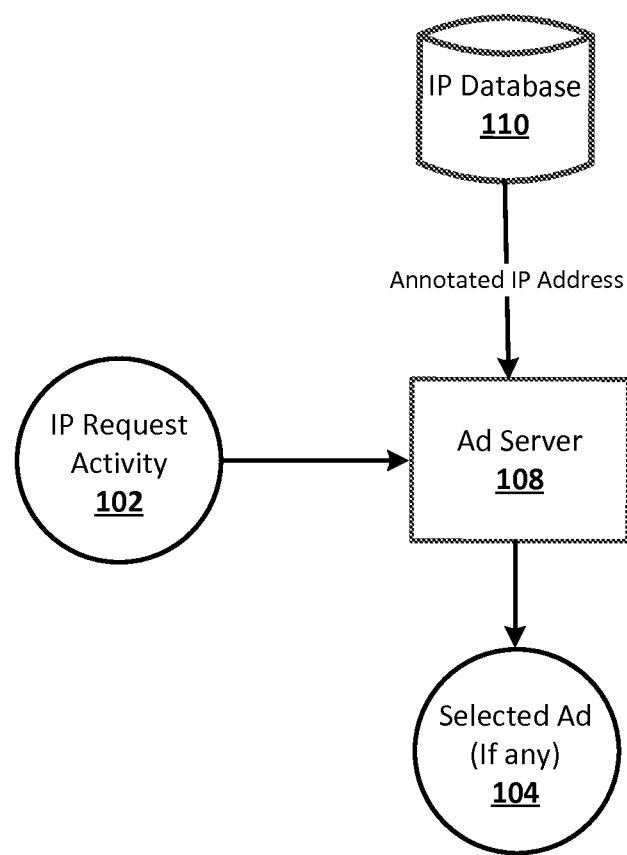
FIG. 8 illustrates an example of determining an advertisement to provide responsive to an advertisement request.

FIG. 8 illustrates an example of determining an advertisement to provide with a request. Ad server 108 may receive an IP request activity 102 from a server that is servicing web requests from computing devices. The IP request activity 102 may include an IP address of the intended target of an advertisement, and may additionally include request data as described herein. Ad server 108 may identify entries in IP database 110 based on the IP address of the IP request activity 102. In some implementations, the entries of IP database 110 may include one or more likely categories for the identified IP address, as described herein. In some implementations, ad server 108 may provide a selected ad 104 to the IP address of the IP request activity 104 and/or to the server that provided the IP request activity.

In some implementations, ad server 108 may determine which ads to provide based on information from IP database 110. For example, ad server 108 may serve ads from a plurality of advertisers, and incoming requests may be matched with appropriate ads for the request. For example, a request 102 may be provided to ad server 108 and ad server 108 may identify the IP address in IP database 110. Furthermore, ad server 108 may identify a physical location of Kentucky and a likely category of residential that are associated with the IP address in IP database 110. Ad server 108 may host ads from two advertisers: the first advertiser may have more interest in providing commercial requests with ads and/or may have interest in only providing ads to residential IP addresses in Florida; and the second advertiser may have interest in providing advertisements to the southern region of the United States. Ad server 108 may provide the advertisements of the second advertiser based on the physical address information identified in IP database 110.

Figure 9:
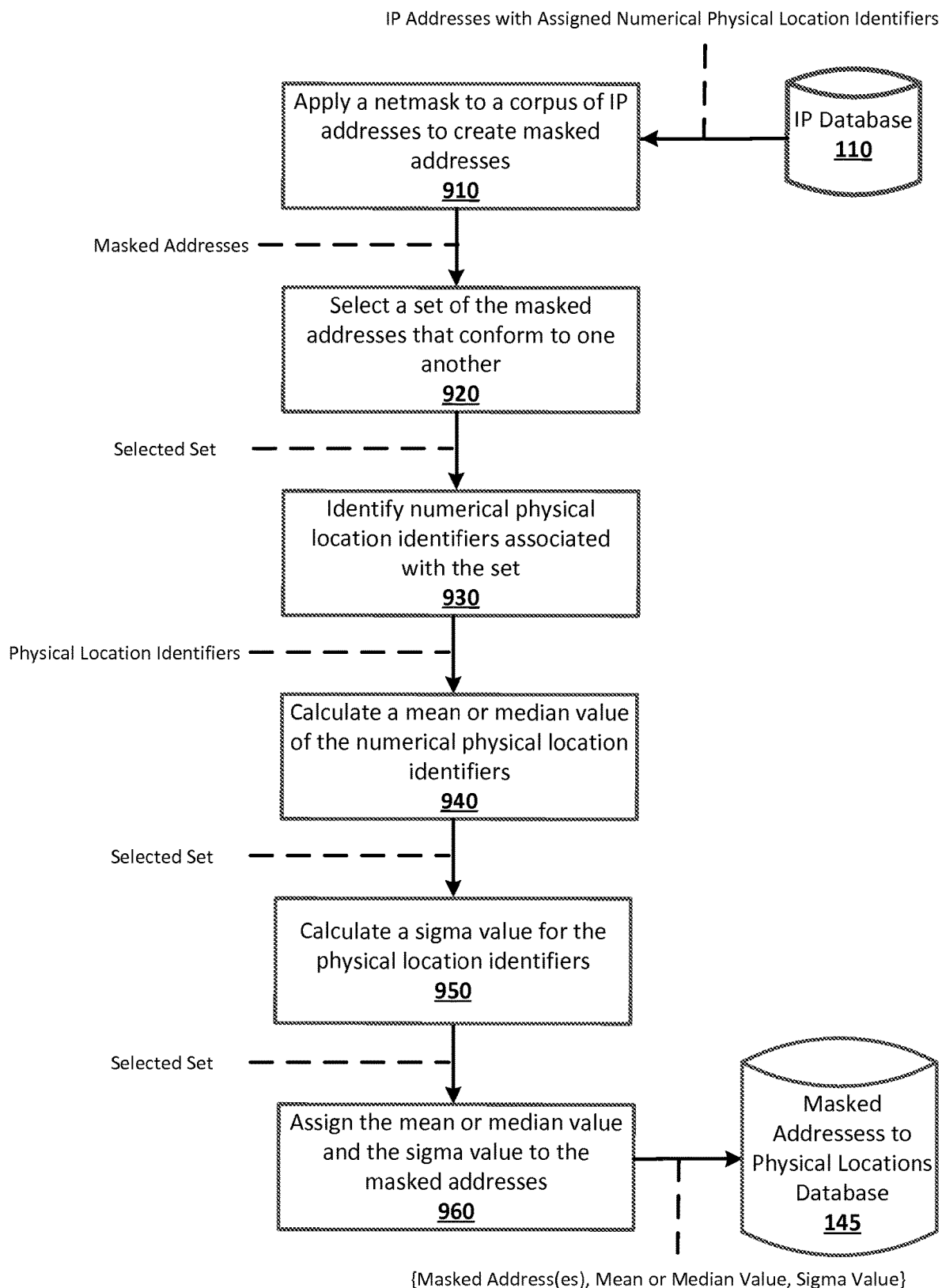
FIG. 9 illustrates an example of generating a mapping of one or more masked addresses of IP addresses to one or more indications of physical locations.

FIG. 9 illustrates an example of generating a mapping of one or more masked IP addresses to one or more indications of physical locations. Aspects of the example of FIG. 9 are described with reference to steps 910, 920, 930, 940, 950, and 960 that may be performed. One or more of the steps may be performed, for example, by the masked addresses to physical locations system 140. Other implementations may perform the steps in a different order, omit certain steps, and/or perform different and/or additional steps than those illustrated in FIG. 9.

At step 910 a netmask is applied to a corpus of IP addresses to create masked addresses. The corpus of IP addresses may be identified from IP database 110 and/or another database and may be restricted to IP addresses that are associated with assigned numerical physical location identifiers. A numerical physical location identifier may include any orderable numbering utilized in identifying a geographic location, or any other spatial ordering from which meaningful classifications may be derived. Examples of numerical physical location identifiers include ZIP codes, census tabulation areas, like tracts and blocks, voting blocks, and so forth. In some implementations, the identified corpus of IP addresses may further be restricted based on one or more criteria such as a "freshness" criteria (e.g., only IP addresses having numerical physical location identifiers assigned within the last X days), a "confidence" criteria (e.g., only IP addresses with highly confident and/or verified assigned physical location identifiers), etc.

The applied netmask may be, for example, a 24 bit netmask such as "255.255.255.0". Netmasks with fewer and/or more bits may be utilized. For example, for IPv6 IP addresses, netmasks of greater than 32 bits may be utilized. Also, as described herein, the example, of FIG. 9 may be iteratively applied to generate mappings for multiple masked IP addresses and each iteration may employ a distinct netmask.

At step 920, a set of the masked addresses that conform to one another may be selected. For example, where a netmask of "255.255.255.0" is applied, the masked addresses that conform to one another may be masked addresses that all have the same 24 bit prefix. For instance, applying a netmask to IP addresses 192.168.1.1 and 192.168.1.2 would result in a masked address of 192.168.1.0 for both. In some implementations, masked addresses that conform to one another may be selected for inclusion in the set when the quantity of the masked addresses satisfies a threshold (e.g., to achieve desired statistical significance).

At step 930, numerical physical location identifiers associated with the set are identified. For example, ZIP codes associated with the IP addresses that led to the masked addresses of the set may be identified. For instance, as described above, IP database 110 may include assigned numerical physical location identifiers for each of the IP addresses of those corpus and those assigned numerical physical location identifiers that correspond to the set may be identified.

At step 940, a mean or median value of the numerical physical location identifiers is calculated. For example, in some implementations the numerical physical location identifiers may be ordered and the median (i.e., $2^{nd}$ quartile) numerical physical location identifier utilized as the median value. The median may be used to represent a mean value, as a performance optimization.

At step 950, a sigma value for the numerical physical location identifiers is calculated. For example, in some implementations the numerical physical location identifiers may be ordered and the sigma value may be determined based on a delta between a first numerical physical location identifier that is less than the median and a second numerical physical location identifier that is greater than the median. For instance, the sigma value may be based on a delta between a first quartile numerical physical location identifier and a third quartile physical location identifier. For example, the delta between the first and third quartiles covers 50% of values, so half that delta is an offset against the median that represents the 0.625 sigma value that approximately covers 50% of values within a normal distribution. Dividing the offset by 0.625 approximates a 1 sigma offset. For example, in quartiles 90202, 90210, 90218, the median is 90210, and 50 percent of the values are covered between 90202 and 90218, or 16 code points. An offset against the median of 8 code points therefore represent a 0.625 sigma, so 1 sigma is an offset of 12.8 code points. Therefore, 90223, being roughly 1 sigma offset away from the median 90120, has a 68% likelihood of veracity. To calculate the likelihood, subtract the survival function of the sigma offset from one half to get the percentile of one side of the distribution, then double the result to get the percentile of both sides of the distribution. That is, 'second_numeral_percentile=(0.5−survival(abs(second_numeral_value−median)/sigma))*2'.

At step 960 the calculated mean or median value and the calculated sigma value may be assigned to the masked addresses. For example, masked addresses of the set are all a single value such as 192.168.1.0, that single value may be assigned the calculated mean or median value. The mean or median value and sigma value may be stored with an indication of assignment to the masked address in the masked addresses to physical locations database 145.

Multiple iterations of one or more steps in FIG. 9 may be performed in some implementations. For example, steps 930, 940, 950, and 960 may be performed multiple times for a set selected at step 920, with each iteration involving a unique type of physical location identifier. For instance, the first iteration may involve ZIP codes, whereas the second iteration may involve census block GEOID codes. Also, for example, steps 920, 930, 940, 950, and 960 may be performed multiple times, with each iteration involving a unique set of masked addresses. For instance, the first iteration may involve a set of addresses that are all a single value such as 192.168.1.0 and the second iteration may involve a set of addresses that are all a separate single value such as 199.199.199.0. As yet another example, steps 910, 920, 930, 940, 950, and 960 may be performed multiple times, with each iteration involving a unique netmask. For instance, the first iteration may involve a 24 bit netmask and the second iteration may involve a 25 bit netmask. Through multiple iterations of the example illustrated in FIG. 9, a mapping of masked IP addresses to one or more indications of physical locations that is of a desired breadth may be achieved.

As described, a mapping generated based on the example of FIG. 9 may be utilized in various techniques described herein. For example, in some implementations the veracity of one or more aspects of a determined physical location for an IP address may be determined based on the mapping of one or more masked addresses of the IP address to the indication of the physical location. For instance, the indication of the physical location may include a mean or median ZIP code mapped to a masked address of the IP address, and a deviation value for the mean or median ZIP code. The veracity of a ZIP code of the determined physical location may be determined based on comparison of that ZIP code to the mean or median ZIP code and/or the deviation value for the mean or median ZIP code.

Figure 10:
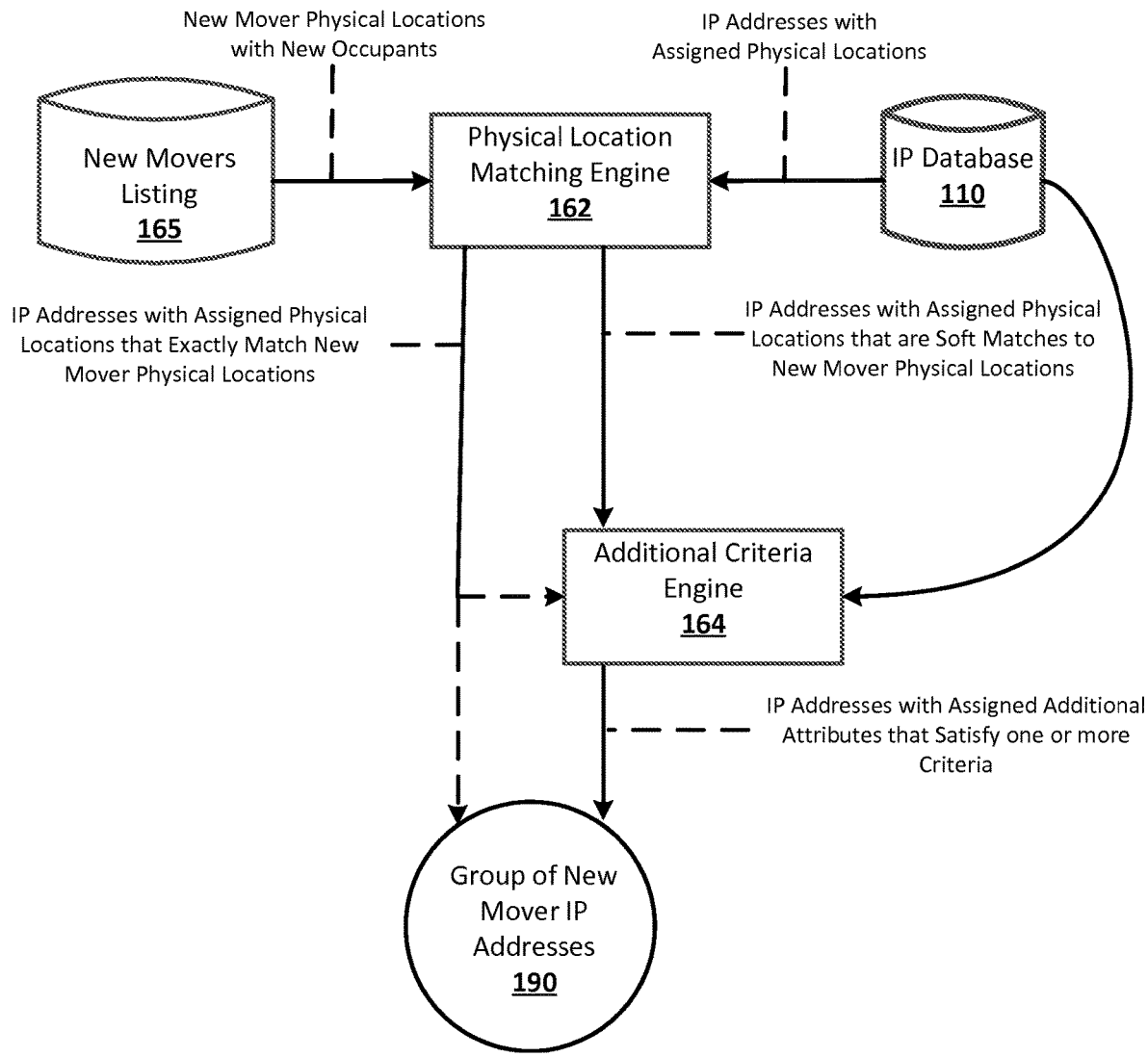
FIG. 10 illustrates an example of determining a group of IP addresses that are associated with physical locations with new occupants.

FIG. 10 illustrates an example of determining a group of IP addresses that are associated with physical locations with new occupants. In FIG. 10 the physical location matching engine 162 identifies, from new movers listing 165, a plurality of new mover physical locations with new occupants. The physical location engine 162 further accesses IP database 110 that includes IP addresses with assigned physical locations. In some implementations, the IP database 110 may include IP addresses with assigned physical locations determined according to one or more techniques described herein.

The physical location engine 162 determines IP addresses with assigned physical locations from IP database 110 that match new mover physical locations identified from new movers listing 165. As indicated by the two arrows emanating from the physical location engine 162, in some implementations the engine 162 may utilize exact matching and/or soft matching in determining physical locations assigned to IP addresses match new mover physical locations of the new movers listing 165. As indicated by the right-most arrow emanating from the physical location engine 162, the engine 162 provides the IP addresses with assigned physical locations that are soft matches to new mover physical addresses to the additional criteria engine 164. As indicated by the broken line portion of the left-most arrow that emanates from the physical location engine 162 and terminates at the additional criteria engine 164, in some implementations the IP addresses with assigned physical locations that exactly match new mover physical addresses may also be provided to the additional criteria engine 164. As indicated by the broken line portion of the left-most arrow that terminates at the group of new mover IP addresses 190, in some implementations the IP addresses with assigned physical locations that exactly match new mover physical addresses are included in the group of new mover IP addresses 190 without further analysis by additional criteria engine 164.

The additional criteria engine 164 determines, for the provided IP addresses, a set of the IP addresses that have one or more corresponding assigned additional attributes that satisfy one or more criteria. The one or more corresponding assigned additional attributes of IP addresses may be assigned to the IP addresses in IP database 110. The additional criteria engine 164 includes the IP addresses of the set in the group of new mover IP addresses 190. The additional attributes and the at least one criterion can be selected to provide additional assurance that IP addresses included in group of new mover IP addresses are associated with "new movers."

As one example, the at least one additional assigned attribute may include an IP address discovery timestamp and the at least one criterion may be a temporal threshold. The IP address discovery timestamp of an IP address may be a temporal indicator of when the IP address was discovered in use. For example, it may be a date and/or time that the IP address was first assigned in IP database 110, or a date and/or time when the IP address was first assigned to its current physical location in IP database 110. For instance, it may be a time and/or date that the IP location determination engine 126 or the masked address to physical locations system 140 assigned the current physical location of the IP address to that IP address in IP database 110. The temporal threshold may be set to identify IP addresses that are associated with IP address discovery timestamps indicating recent activation of the IP addresses. For example, the temporal threshold may be set to identify IP addresses whose IP address discovery timestamps indicate activation within the most recent day, three days, week, two weeks, or month.

As another example, the at least one additional assigned attribute may additionally and/or alternatively include a residential likelihood that the IP address is associated with a residential location. The residential likelihood may be a true/false (e.g., binary) value or may be one of a range of three or more values. In some implementations, the residential likelihood may be determined by category determination engine 128 as described herein. The threshold for the residential likelihood may be a likelihood threshold. For example, where the residential likelihood is either true or false, the likelihood threshold may be "equals true". Also, for example, where the residential value can be a plurality of values from 0 to 1 (e.g., 0.12, 0.56, 0.80), the likelihood threshold may be "greater than 0.6".

As yet another example, the at least one additional assigned attribute may additionally and/or alternatively include connection speed indication that indicates a connection speed of the IP address and the at least one criterion may be a threshold connection speed (e.g., to ensure the connection speed is a speed likely to be associated with a residential location). For example, as described above category determination engine 128 and/or other component may determine connection speeds associated with requests from IP addresses and those connection speeds may be assigned to the corresponding IP addresses in the IP database 110. For instance, a request from an IP address may be associated with a connection speed of 10 Mbps. The threshold for a connection speed for an attribute may be, for example, "less than 100 Mbps".

In FIG. 10 the physical location matching engine 162 determines IP addresses with assigned physical locations that match new mover physical locations of the new movers listing 165 and provides one or more of those IP addresses to additional criteria engine 164 to enable the engine 164 to determine IP addresses for inclusion in the group based on those IP addresses being associated with additional attributes that satisfy one or more criterion. However, as described above with respect to FIG. 1, it is noted that in some implementations the engine 162 and engine 164 may work in concert and/or the engine 164 may make one or more determinations prior to the engine 162 to restrict the set of the IP addresses that are considered by engine 162 (e.g., engine 164 may determine a set of IP addresses that have IP address discovery timestamps that satisfy a temporal threshold may be considered—and that set may be the only set considered by engine 162).

Figure 11:
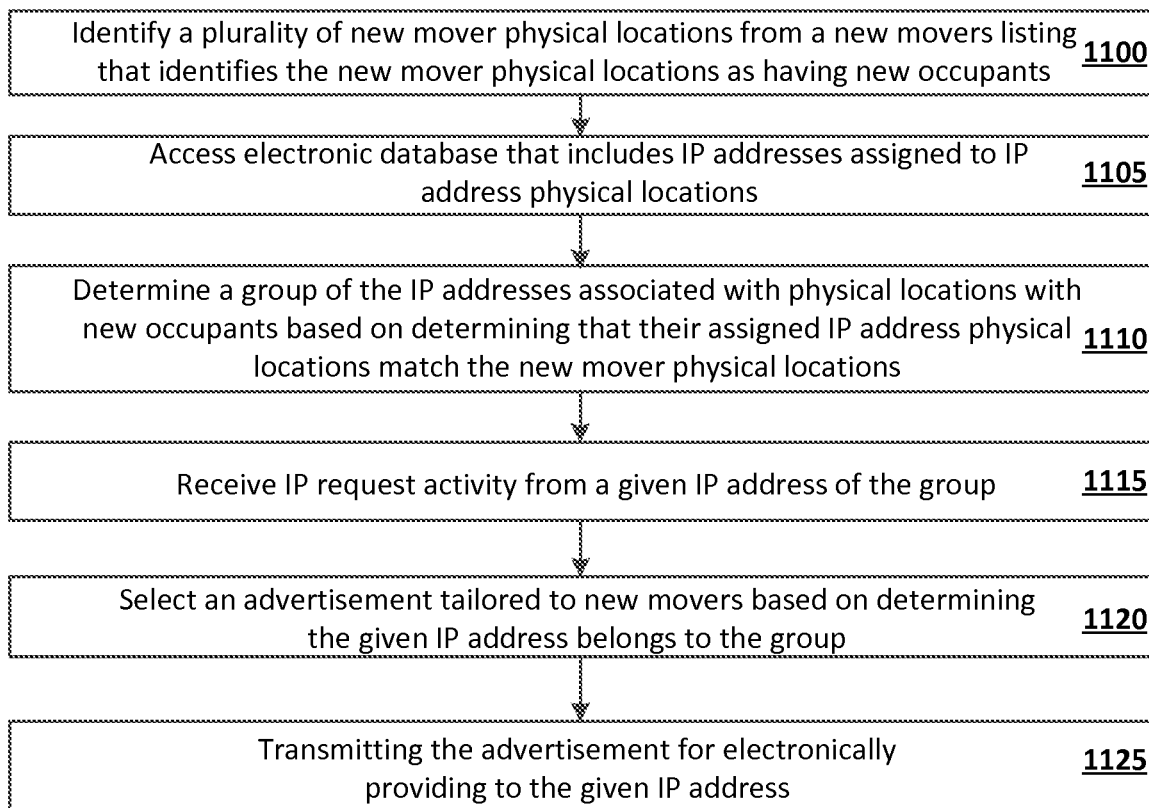
FIG. 11 illustrates an example method of determining IP addresses that are associated with physical locations with new occupants.

FIG. 11 illustrates an example method of determining IP addresses that are associated with physical locations with new occupants. Other implementations may perform the steps in a different order, omit certain steps, and/or perform different and/or additional steps than those illustrated in FIG. 11. For convenience, aspects of FIG. 11 will be described with reference to a system that may perform the method, such as new movers IP addresses determination system 160.

At step 1100, the system identifies a plurality of new mover physical locations from a new movers listing that identifies the new mover physical locations as having new occupants.

At step 1105, the system accesses an electronic database that includes IP addresses assigned to IP address physical locations.

At step 1110, the system determines a group of the IP addresses associated with physical locations with new locations based on determining that their assigned IP address physical locations match the new mover physical locations. In some implementations, the system determines a group of the IP addresses associated with physical locations with new locations based on determining that their assigned IP address physical locations match the new mover physical locations and based on determining that corresponding additional attributes assigned to the IP addresses of the group satisfy at least one criterion. The additional assigned attributes and the at least one criterion can be selected to provide additional assurance that IP addresses are associated with "new movers." For example, the at least one additional assigned attribute for each of the IP addresses may include an IP address discovery timestamp (an indicator of when the IP address was discovered in use) and the at least one criterion may be a temporal threshold (e.g., that the discovery timestamp indicates discovery within the last month, within the last week, or within the last 3 days). Also, for example, the at least one additional assigned attribute for each of the IP addresses may additionally and/or alternatively include a residential likelihood that the IP address is associated with a residential location and the at least one criterion may be a likelihood threshold.

At step 1115, the system receives IP request activity from a given IP address of the group determined at step 1110.

At step 1120, the system selects an advertisement that is tailored to new movers based on determining the given IP address belongs to the group determined at step 1110. For example, the system may select an advertisement from a campaign targeted to new movers based on the given IP address belonging to the group determined at step 1110, and optionally based on the given IP address satisfying one or more additional campaign criteria.

At step 1125, the system transmits the advertisement for electronically providing to the given IP address. For example, the advertisement may be transmitted by or to an ad server for providing to a computing device associated with the given IP address for presentation to a user of the computing device.

In some implementations, the system may verify that the advertisement transmitted for electronically providing to the given IP address was selected via user interface input at a computing device associated with the given IP address. Selection may include a "click" or other user interface input directed at the advertisement, optionally in combination with at least a threshold amount of "dwell" time by the computing device on a webpage or other source linked to in the advertisement and presented on the computing device in response to the selection. Various techniques may be utilized to verify selection of an advertisement such as embedded code in links in advertisements, etc. In some implementations, based on verifying the advertisement transmitted for electronically providing to the given IP address was selected via user interface input at a computing device associated with the given IP address, the system flags or otherwise annotates the physical location assigned to the given IP address for targeting with non-electronic communications (e.g., "snail mail"). In other words, the selection of the advertisement may serve as a strong signal that an occupant at the physical location assigned to the given IP address is interested in "new mover" advertisements—and the system may utilize this strong signal to select physical locations for targeting with further non-electronic advertisements or other communications.

In some implementations, the method of FIG. 11 may omit one or more (e.g., all) of steps 1115, 1120, and 1125.

FIG. 12 is a block diagram of an example computer system 1212. Computer system 1212 typically includes at least one processor 1214 which communicates with a number of peripheral devices via bus subsystem 1210. These peripheral devices may include a storage subsystem 1224, including, for example, a memory subsystem 1225 and a file storage subsystem 1226, user interface input devices 1222, user interface output devices 1220, and a network interface subsystem 1216. The input and output devices allow user interaction with computer system 1212. Network interface subsystem 1216 provides an interface to outside networks and is coupled to corresponding interface devices in other computer systems.

User interface input devices 1222 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 1212 or onto a communication network.

User interface output devices 1220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1212 to the user or to another machine or computer system.

Storage subsystem 1224 stores programming and data constructs that provide the functionality of some or all of the modules described herein. For example, the storage subsystem 1224 may include the logic to perform one or more of the methods described herein such as, for example, the methods of FIGS. 3, 5, and/or 7.

These software modules are generally executed by processor 1214 alone or in combination with other processors. Memory 1225 used in the storage subsystem can include a number of memories including a main random access memory (RAM) 1230 for storage of instructions and data during program execution and a read only memory (ROM) 1232 in which fixed instructions are stored. A file storage subsystem 1226 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1226 in the storage subsystem 1224, or in other machines accessible by the processor(s) 1214.

Bus subsystem 1210 provides a mechanism for letting the various components and subsystems of computer system 1212 communicate with each other as intended. Although bus subsystem 1210 is shown schematically as a single bus, alternative implementations of the bus subsystem may use multiple busses.

Computer system 1212 can be of varying types including a workstation, server, computing cluster, blade server, server farm, or any other data processing system or computing device. Due to the ever-changing nature of computers and networks, the description of computer system 1212 depicted in FIG. 12 is intended only as a specific example for purposes of illustrating some implementations. Many other configurations of computer system 1212 are possible having more or fewer components than the computer system depicted in FIG. 12.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure. What is claimed is:

The invention claimed is:

1. A method of determining IP addresses that are associated with physical locations with new occupants, the method implemented by one or more processors, and the method comprising:

identifying a plurality of new mover listing physical locations from a new movers listing that identifies the new mover listing physical locations as having new occupants;

accessing at least one electronic database that includes IP addresses each assigned to a corresponding IP address physical location, wherein the electronic database further includes, for each of a plurality of the IP addresses, at least one corresponding additional attribute that is assigned to the IP address and that is determined based on one or more past requests from the IP address;

selecting a set of the IP addresses of the electronic database that are associated with physical locations with new occupants, the selecting comprising selecting the set of the IP addresses based on:
  the corresponding IP address physical locations assigned to the IP addresses of the set each matching a corresponding one of the new mover listing physical locations, and
  the corresponding additional attributes that are assigned to the IP addresses of the set satisfying at least one criterion;

receiving an IP request activity from a given IP address subsequent to determining the set of the IP addresses;

selecting, based on determining the given IP address belongs to the set of the IP addresses, content tailored to new movers;

transmitting, over one or more networks and in response to the IP request activity, the content for electronically providing to the given IP address;

verifying that the content electronically provided to the given IP address is selected via user interface input at a computing device associated with the given IP address; and based on the verifying, selecting the corresponding IP address physical location for targeting with non-electronic snail mail communications.

2. The method of claim 1, wherein the corresponding additional attributes that are assigned to the IP addresses include residential likelihoods, wherein each of the residential likelihoods indicates a likelihood that a corresponding IP address is associated with a residential location.

3. The method of claim 2, further comprising:
determining a residential likelihood of the residential likelihoods for an IP address of the IP addresses based on the one or more past requests originating from the IP address.

4. The method of claim 3, wherein determining the residential likelihood based on the one or more past request originating from the IP address comprises determining the residential likelihood based on times associated with the past requests from the IP address.

5. The method of claim 1, wherein the corresponding additional attributes that are assigned to the IP addresses of the set include connection speed indications that each indicates a corresponding connection speed of a corresponding IP address, and wherein the at least one criterion includes that the connection speed is less than a threshold connection speed.

6. The method of claim 1, wherein the corresponding IP address physical location assigned to the given IP address identifies an area that encompasses a plurality of particular residential addresses.

7. The method of claim 6, wherein selecting the given IP address for inclusion in the set comprises:
determining that the corresponding IP address physical location assigned to the given IP address matches a given mover listing physical location of the mover listing physical locations based on the given mover listing physical location being one of the particular residential addresses encompassed by the corresponding IP address physical location assigned to the given IP address.

8. The method of claim 6, wherein the area identified by the corresponding IP address physical location assigned to the given IP address is a numerical identifier.

9. The method of claim 8, wherein the numerical identifier is one of a zip code and a census block.

10. A system, comprising:
at least one electronic database that includes IP addresses each assigned to a corresponding IP address physical location, wherein the electronic database further includes, for each of a plurality of the IP addresses, at least one corresponding additional attribute that is assigned to the IP address;

memory storing instructions;

one or more processors operable to execute the instructions stored in the memory to:
  identify a plurality of new mover listing physical locations from a new movers listing that identifies the new mover listing physical locations as having new occupants;
  select, based on accessing the at least one electronic database, a set of the IP addresses of the electronic database that are associated with physical locations with new occupants, wherein in selecting the set of the IP addresses one or more of the processors are to select the set of the IP addresses based on:
    the corresponding IP address physical locations assigned to the IP addresses of the set each matching a corresponding one of the new mover listing physical locations, and
    the corresponding additional attributes that are assigned to the IP addresses of the set satisfying at least one criterion;
  receive an IP request activity from a given IP address subsequent to determining the set of the IP addresses;
  select, based on determining the given IP address belongs to the set of the IP addresses, content tailored to new movers;
  transmit, over one or more networks and in response to the IP request activity, the content for electronically providing to the given IP address;
  verify that the content electronically provided to the given IP address is selected via user interface input at a computing device associated with the given IP address; and
  based on the verifying, select the corresponding IP address physical location for targeting with non-electronic snail mail communications.

11. The system of claim 10, wherein the corresponding additional attributes that are assigned to the IP addresses include residential likelihoods, wherein each of the residential likelihoods indicates a likelihood that a corresponding IP address is associated with a residential location.

12. The system of claim 11, wherein one or more of the processors are operable to execute the instructions further to:
determine a residential likelihood of the residential likelihoods for an IP address of the IP addresses based on one or more past requests originating from the IP address.

13. The system of claim 12, wherein in determining the residential likelihood based on the one or more past request originating from the IP address, one or more of the processors are to determine the residential likelihood based on times associated with the past requests from the IP address.

14. The system of claim 10, wherein the corresponding additional attributes that are assigned to the IP addresses of the set include connection speed indications that each indicates a corresponding connection speed of a corresponding IP address, and wherein the at least one criterion includes that the connection speed is less than a threshold connection speed.

15. The system of claim 10, wherein the corresponding IP address physical location assigned to the given IP address identifies an area that encompasses a plurality of particular residential addresses.

16. The system of claim 15, wherein in selecting the given IP address for inclusion in the set one or more of the processors are to:

determine that the corresponding IP address physical location assigned to the given IP address matches a given mover listing physical location of the mover listing physical locations based on the given mover listing physical location being one of the particular residential addresses encompassed by the corresponding IP address physical location assigned to the given IP address.

17. The system of claim 16, wherein the area identified by the corresponding IP address physical location assigned to the given IP address is a numerical identifier.

18. The system of claim 17, wherein the numerical identifier is one of a zip code and a census block.

19. The system of claim 15, wherein the area identified by the corresponding IP address physical location assigned to the given IP address is a numerical identifier.

20. The system of claim 19, wherein the numerical identifier is one of a zip code and a census block.

* * * * *